United States Patent
Yokoyama et al.

(10) Patent No.: US 6,760,579 B1
(45) Date of Patent: Jul. 6, 2004

(54) RECEIVING SYSTEM HAVING A PLURALITY OF FREQUENCY CONVERTERS FOR USE WITH A VEHICLE

(75) Inventors: Masaho Yokoyama, Hyogo (JP); Manabu Horimoto, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 09/449,482

(22) Filed: Nov. 29, 1999

(30) Foreign Application Priority Data

Nov. 27, 1998 (JP) .......................................... 10/338095
Nov. 27, 1998 (JP) .......................................... 10/338096

(51) Int. Cl.⁷ ................................................. H04B 1/06
(52) U.S. Cl. ...................... 455/352; 455/345; 340/5.72; 340/5.61; 340/5.64; 340/825.72
(58) Field of Search ........................ 455/345, 352–354, 455/132, 200.1, 227, 315; 340/825.44, 825.72, 825.31, 5.72, 5.61, 5.64

(56) References Cited

U.S. PATENT DOCUMENTS

| | | | | |
|---|---|---|---|---|
| 5,140,698 A | * | 8/1992 | Toko | 340/7.34 |
| 5,193,212 A | * | 3/1993 | Son | 340/7.36 |
| 5,204,656 A | * | 4/1993 | Scheinert et al. | 340/7.35 |
| 5,239,697 A | * | 8/1993 | Kosuga | 455/133 |
| 5,392,457 A | * | 2/1995 | Davis et al. | 340/7.38 |
| 5,635,923 A | * | 6/1997 | Steele et al. | 340/905 |
| 5,671,267 A | * | 9/1997 | August et al. | 455/420 |
| 5,722,058 A | * | 2/1998 | Umemoto et al. | 340/825.72 |
| 5,790,065 A | * | 8/1998 | Yaroch | 341/173 |
| 5,815,052 A | * | 9/1998 | Nakajima et al. | 333/175 |
| 6,185,411 B1 | * | 2/2001 | Gillig et al. | 331/14 |
| 6,223,029 B1 | * | 4/2001 | Stenman et al. | 455/420 |
| 6,335,576 B1 | * | 1/2002 | Wallace | 307/10.2 |
| 6,373,398 B2 | * | 4/2002 | Matsumoto | 340/825.72 |
| 6,577,226 B1 | * | 6/2003 | Steiner | 340/5.62 |
| 6,606,492 B1 | * | 8/2003 | Losey | 455/411 |
| 6,617,975 B1 | * | 9/2003 | Burgess | 340/815.47 |
| 6,628,964 B1 | * | 9/2003 | Bates et al. | 348/14.05 |
| 2001/0040503 A1 | * | 11/2001 | Bishop | 340/426 |

FOREIGN PATENT DOCUMENTS

| | | | |
|---|---|---|---|
| JP | 7-137538 | | 5/1995 |
| JP | 7-246915 | | 9/1995 |
| JP | 8-144597 | | 6/1996 |
| JP | 11013319 A | * | 1/1999 |

* cited by examiner

*Primary Examiner*—Nay Maung
*Assistant Examiner*—Sujatha Sharma
(74) *Attorney, Agent, or Firm*—Wenderoth, Lind & Ponack, L.L.P.

(57) ABSTRACT

The present invention provides a mobile receiver, whereby the power consumption can be kept as lower as possible, as the size of the automobile equipment control system, the placement space thereof and the cost can be reduced, since an antenna and part of receiving circuits for keyless entry system are also used as those of a mobile radio receiver. Moreover, in order to prevent the users from feeling inconvenience in its use, the mobile receiver has a construction wherein a mixing circuit, a local oscillator circuit and the like for keyless entry system and those for radio receiver are separately arranged though the antenna and an intermediate frequency amplifier circuit are used both for keyless entry system and for radio receiver. As a result, signals from the remote control side can be received even while someone is listening to the radio.

10 Claims, 18 Drawing Sheets

Fig. 18
(a)
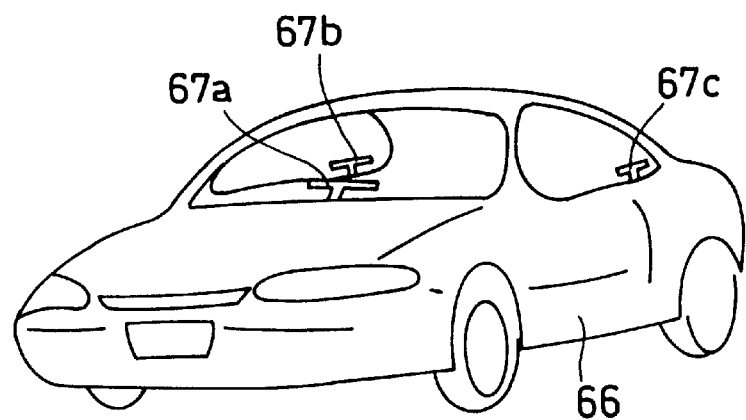
(b)
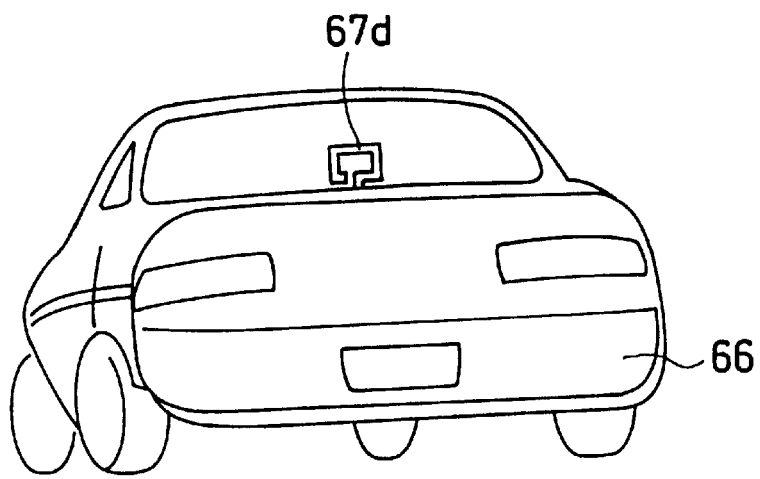

RECEIVING SYSTEM HAVING A PLURALITY OF FREQUENCY CONVERTERS FOR USE WITH A VEHICLE

BACKGROUND OF THE INVENTION

1. Field of the Invention

The present invention relates to a mobile receiver wherein an antenna and part of a receiving circuit is used for a keyless entry system or the like for remotely controlling the lock/unlock of vehicle doors, trunk and the like are also used as those of a mobile radio receiver, and to an antenna device wherein an antenna is used both for receiving remote control signals for remotely controlling a drive mounted on a vehicle and for receiving radio broadcast waves.

2. Description of the Relevant Art

Hitherto, the keyless entry system whereby the lock/unlock of vehicle doors and the like is remotely controlled has a construction entirely separate from a mobile radio receiver. Therefore, an antenna and receiving circuits for keyless entry system are mounted on a vehicle without finding sufficient space for the placement thereof, resulting in complication of the placement construction thereof and a high cost.

In order to solve the above problems, a system was proposed, wherein an antenna and part of a receiving circuit for a keyless entry system also serves as those of a mobile radio receiver so as to make the construction of the automobile equipment control system more compact and reduce the placement space thereof (Japanese Utility Model Publication No. 06-67748).

FIG. 1 is a block diagram schematically showing the principal part of a radio receiver. In the figure, reference numeral 11 represents an antenna for a radio receiver, and a high frequency signal input to the antenna 11 is amplified in a high frequency amplifier circuit 12. The amplified signal and a local oscillation signal from a local oscillator circuit 14B are mixed in a mixing circuit 13B, and are taken as an intermediate frequency signal. The intermediate frequency signal from the mixing circuit 13B is amplified in an intermediate frequency amplifier circuit 19B. The amplified signal is detected in a detector circuit 20, and then, is amplified in a low frequency amplifier circuit 21. It is output as a voice through a speaker 22. A PLL circuit 15B performs the phase lock of the oscillation signal from the local oscillator circuit 14B under the control of a CPU 16B, so as to stabilize the intermediate frequency output signal from the mixing circuit 13B.

FIG. 2 is a block diagram schematically showing the principal part of a conventional mobile receiver disclosed in the above publication. In the figure, reference numeral 31 represents a frequency switching means to switch between an oscillation signal sent out from a local oscillator circuit 14c for radio and that for keyless entry system. The frequency switching means comprises a PLL circuit 15c and a CPU 16c.

A mixing circuit 13c is connected through a change-over switch 17 which is switched depending on the operating positions of an ignition switch 18 to an intermediate frequency amplifier circuit 23 for keyless entry system. The output from the intermediate frequency amplifier circuit 23 is input through a detector circuit 24 to a controller 25, which controls a motor 26 or the like, being a door lock/unlock drive, in response to the output from the detector circuit 24.

The voltage of a battery 27 mounted on a vehicle is constantly applied to a keyless circuit 28 which is enclosed with the dotted lines, while it is selectively supplied to an ACC (accessory) contact 18a, an ignition contact 18b and a start contact 18c depending on the operating positions of the ignition switch 18. The keyless side becomes capable of operation when the ignition switch 18 is in an off contact (OFF), while the radio side becomes capable of operation when the ignition switch 18 is in the ACC contact 18a.

FIG. 3 is a block diagram schematically showing the principal part of a conventional receiver for keyless entry system. A battery 27 is connected through a power line 8 for supplying electric power to each receiving circuit (high frequency amplifier circuit 2, mixing circuit 3B, local oscillator circuit 4B, intermediate frequency amplifier circuit 5B, detector circuit 6 and signal processing circuit 7). A switch 9 which is intermittently make-and-break controlled by a CPU 10 is interposed in the power line 8, so that electric power is intermittently supplied to each receiving circuit (e.g. electric power is supplied thereto for 10 msec every 100 msec), resulting in a controlled power consumption.

FIG. 4 is a timing chart showing an example of the relationship between the timing of the output of on/off control signals from the CPU 10 and that of the power supply to each receiving circuit.

Since the receiving frequencies of a radio receiver are 100 MHz and less, the PLL circuit 15B only for radio receiver shown in FIG. 1 is only required to lock phases within that range.

On the other hand, the receiving frequency band in the keyless entry system is usually 300–400 MHz, which is 3–4 times higher than the receiving frequencies of the radio receiver. Therefore, the PLL circuit 15C in the mobile radio and keyless entry system receiver shown in FIG. 2 must be able to lock phases covering a wider range than that only for radio broadcasting, resulting in a higher cost and difficulty in tuning.

When the ignition switch 18 is in the off contact (the engine is not running), or when it is originally desired that the power consumption should be kept as low as possible, the mobile radio and keyless entry system receiver must keep being supplied with electric power.

Since the mode changes between the radio receiving mode and the keyless receiving mode depending on the operating positions of the ignition switch 18, the keyless signals cannot be received during the radio receiving mode.

Hitherto, the keyless entry system whereby a drive mounted on a vehicle, for example, a drive to perform the lock/unlock of doors and the like is remotely controlled and has a construction entirely separate from a car radio. Therefore, antenna and receiving circuits for keyless entry systems are often mounted on a vehicle without finding sufficient space for the placement thereof, resulting in the complication of the placement construction thereof and a high cost.

In order to solve the above problems, a system was proposed, wherein an antenna and part of the receiving circuits for a car radio receiver are also used as those for keyless entry system so as to make the construction of the automobile equipment control system more compact and to reduce the placement space thereof.

As an antenna for a car radio receiver, a pole antenna having a form of a metal pole projected from the body shell is exemplified. The antenna length of the pole antenna is set to approximately 100 cm, which is not sufficient considering the wavelength of AM broadcast waves, but is suitable for receiving FM broadcast waves. As the construction of the pole antenna, there are pole antennas which can be stowed away into the vehicle body and those which cannot be stowed therein. In the stowage-type pole antennas, some are stowed by manual system, and others are stowed by electromotive systems, which may include a long and slender telescopic pipe which comprises several segmented portions is caused to vertically move. antennas which can be stowed away into the vehicle body and those which cannot be stowed therein. In the stowage-type pole antennas, some are stowed by manual system, and others are stowed by electromotive systems. A long and slander telescopic pipe which is several-sigmented is caused to vertically move.

By stowing the antenna away into the vehicle body when it is not needed, the antenna can be protected from damage caused by touching an obstacle, mischief of the wrong-minded, and the like. Especially when the antenna is left long in the stop state of the vehicle, the risk of suffering mischief is high. Therefore, it is extremely effective to keep the antenna inside the body during the vehicle stop.

However, when a pole antenna is used both for the keyless entry system and for a car radio receiver, remote control signals (keyless signals) for remotely controlling the door lock/unlock need to be received by the pole antenna. Therefore, the pole antenna cannot be kept inside the body even when the vehicle is stopped, which results in difficulty with protecting the pole antenna from mischief.

There may be another way to use a glass antenna as a radio receiver antenna for a keyless entry system. But since a conventional glass antenna for radio receiver is arranged only on the rear window glass, it cannot sufficiently receive keyless signals. That is because it is difficult to efficiently receive keyless signals which are sent out in the almost horizontal direction only from a limited direction of the front, rear, left or right sides of the vehicle, unlike the radio broadcast waves which come flying from every direction, using the glass antenna arranged only on the rear window glass.

SUMMARY OF THE INVENTION

The present invention was developed in order to solve the above problems, and it is an object of the present invention to provide a mobile receiver, wherein an antenna and part of receiving circuits are used for a keyless entry system or the like for remotely controlling the lock/unlocking of vehicle doors, trunk and the like are also used as those for a mobile radio receiver so as to reduce the size of the automobile equipment control system, the placement space thereof and the cost, and to keep the power consumption as low as possible.

In order to achieve the above object, a mobile receiver according to the first aspect of the present invention is characterized by having a remote control antenna and a remote control receiving circuits for receiving remote control signals for remotely controlling a drive mounted on a vehicle, a radio receiver antenna and a radio receiver receiving circuits for receiving signals for a radio receiver, the remote control antenna and the radio receiver antenna being one and the same antenna. While part of the remote control receiving circuits is part of the radio receiver receiving circuits, a first frequency conversion means to convert a signal input through the antenna into a prescribed frequency is arranged in the remote control receiving circuits, and a second frequency conversion means to convert a signal input through the antenna into a prescribed frequency arranged in the radio receiver receiving circuits, which is separate from the first frequency conversion means.

Using the mobile receiver according to the first aspect of the present invention, it is possible to receive signals from the remote control side even while someone is listening to the radio in the vehicle, since the first frequency conversion means (frequency conversion means for remote control) is separate from the second frequency conversion means (frequency conversion means for radio receiver).

A mobile receiver according to the second aspect of the present invention, is characterized by the first and second frequency conversion means, which comprises local oscillator circuits in the mobile receiver according to the first aspect of the present invention.

Using the mobile receiver according to the second aspect of the present invention, it is possible to receive signals from the remote control even while someone is listening to the radio in the vehicle, since the local oscillator circuit for radio receiver and that for remote control are separately arranged. The remote control receiving frequency is a fixed frequency, unlike the receiving frequency for radio receiver, so the rise time becomes shorter when the local oscillation signal is directly generated using a SAW resonator or the like. That is favorable to the intermittent receiving, and so the power consumption can be reduced.

A mobile receiver according to the third aspect of the present invention is characterized by the first and second frequency conversion means, which comprises the local oscillator circuits and mixing circuits in the mobile receiver according to the first aspect of the present invention.

From the viewpoint of a lower power consumption, the mixing circuit for the remote control need not keep receiving signals constantly, unlike the mixing circuit for radio receiver. Or the mixing circuit for the remote control need not keep being supplied with electric power constantly. Therefore, it is better to adapt it to the intermittent receiving. It is more desirable that the mixing circuit for remote control is a separate mixing circuit having a short rise time without being used as a radio receiver. It is inadvisable to use a mixing circuit 13C as both a radio receiver and as a remote control like in a conventional mobile receiver shown in FIG. 2.

In the mobile receiver according to the third aspect of the present invention, the mixing circuit for the radio receiver and for the remote control are separately arranged so as to solve the above problem. The mixing circuit for the remote control is not required to have a very high performance as compared with that for a radio receiver. Therefore, it is possible to make the mixing circuit for the remote control have a simple circuit construction, whereby the power consumption therein can be kept as low as possible.

A mobile receiver according to the fourth aspect of the present invention, is characterized by having a first filter for detecting only the signals for the remote control arranged in the remote control receiving circuits, and a second filter for detecting only the signals for the radio receiver arranged in the radio receiver receiving circuits. This is separate from the first filter in one of the mobile receivers according to the first through third aspects of the present invention.

Using the mobile receiver according to the fourth aspect of the present invention, a signal for the radio receiver and that for the remote control can be separately taken by the filters. Even if both of the signals for the radio receiver and that for the remote control are input in parallel without distinction between them to an intermediate frequency amplifier circuit. As a result, the intermediate frequency amplifier circuit can be used for both.

A mobile receiver according to the fifth aspect of the present invention, is characterized by the-remote control receiving circuits including plural signal processing elements to output a processed signal to the next step, switches being interposed in each power line for supplying electric power to each of the signal processing elements, and having a first control means to perform sequential intermittent on/off control of each of the switches at a prescribed timing in one of the mobile receivers according to the first through fourth aspects of the present invention.

Using the mobile receiver according to the fifth aspect of the present invention, the electrical supply time to each of the receiving circuits can be made shorter than before, because electric power is supplied to each of the signal processing elements in turn, though hitherto electric power is supplied to all of the receiving circuits at the same timing (see FIG. 4). As a result, the total power consumption in the circuits can be sharply reduced. The timing of the power supply to each signal processing elements can be appropriately and easily set owing to switch control by the first control means.

A mobile receiver according to the sixth aspect of the present invention is characterized by the remote control receiving circuit including plural signal processing elements to output a processed signal to the next step, switches being interposed in each power line for supplying electric power to each of the signal processing elements, having a second control means to perform on/off control of each of the switches, and delay circuits being interposed in each control line for transmitting an on/off control signal from the second control means to each of the switches so that each of them is intermittently turned on and off in sequence in one of the mobile receivers according to the first through fourth aspects of the present invention.

Using the mobile receiver according to the sixth aspect of the present invention, the electrical supply time to each receiving circuit can be made shorter than before. Since electric power is supplied to each of the signal processing elements in turn, though hitherto electric power is supplied to all of the receiving circuits at the same timing (see FIG. 4). As a result, the total power consumption in the circuits can be sharply reduced. By interposing the delay circuits, only one signal is required to be output from the second control means to the control lines as before.

A mobile receiver according to the seventh aspect of the present invention is characterized by the remote control receiving circuits including the plural signal processing elements which output a processed signal to the next step, switches being interposed in each power line for supplying electric power to each of the signal processing elements, having a judging means to detect a signal output from a given signal processing element being supplied with electric power and judging whether a remote control signal is existent in the output signal or not, and a third control means to perform on/off control of the switch interposed in the power line for supplying electric power to a signal processing element in the next step to the given signal processing element on the basis of the judgement result from the judging means, whereby each of the switches is intermittently turned on and off in sequence in one of the mobile receivers according to the first through fourth aspects of the present invention.

Using the mobile receiver according to the seventh aspect of the present invention, the electrical supply time to each receiving circuit can be made shorter than before. Since electric power is supplied to each of the signal processing elements in turn, though hitherto electric power is supplied to all of the receiving circuits at the same timing (see FIG. 4). As a result, the total power consumption in the circuits can be sharply reduced. Since it is possible to start up the minimum required signal processing elements in order, waste of power consumption can be further cut.

A mobile receiver according to the eighth aspect of the present invention, is characterized by each of the signal processing elements, which is a first frequency conversion means to convert a signal input from the antenna into a prescribed frequency, an amplifier circuit to amplify the received signal converted by the first frequency conversion means, or a first filter for filtering the received signal amplified in the amplifier circuit to separate a signal for radio receiver from that for remote control in one of the mobile receivers according to the fifth through seventh aspects of the present invention.

Using the mobile receiver according to the eighth aspect of the present invention, it is possible to start up the first frequency conversion means, the amplifier circuit, and the first filter in the order as needed.

A mobile receiver according to the ninth aspect of the present invention is characterized by the drive, which performs the lock/unlock of the vehicle doors and the like in one of the mobile receivers according to the first through eighth aspects of the present invention.

A mobile receiver according to the ninth aspect of the present invention is characterized by the drive, which performs the lock/unlock of the vehicle doors and the like in one of the mobile receivers according to the first through eighth aspects of the present invention.

It is another object of the present invention to provide an antenna device wherein a pole antenna is used both for receiving remote control signals and for receiving radio broadcast waves can be protected from damage caused by a touch with an obstacle, mischief and the like, and an antenna device whereby remote control signals can be reliably received even when a glass antenna is adopted as an antenna for receiving remote control signals.

In order to achieve the above object, an antenna device according to the first aspect of the present invention, wherein an antenna is used both for receiving remote control signals for remotely controlling a drive mounted on a vehicle and for receiving radio broadcast waves, is characterized by having a regulating means to regulate the length of the antenna projected outward from the vehicle body, a first detecting means to detect the occupied/empty state of the vehicle, and a first control means to control the regulating means so that the length of the antenna becomes suitable for receiving remote control signals when the vehicle is in the empty state.

When the vehicle is in the empty state, the need for the antenna to be used for receiving remote control signals (hereinafter, simply referred to as for remote control) is high. Even when the radio is in the on state, the need for the antenna to be used for receiving radio broadcast waves (hereinafter, simply referred to as for radio receiver) appears to be low, since there is no listener to the radio. Therefore, in this case, it is desirable that the length of the antenna should be set so as to become suitable for receiving remote control signals, or to become shorter than the length suitable for receiving radio broadcast waves.

Using the antenna device according to the first aspect of the present invention, the possibility that the antenna is damaged by a touch with an obstacle, mischief and the like can be reduced, since the length of the antenna is regulated so as to become suitable for receiving remote control signals, or to become shorter than the length suitable for receiving radio broadcast waves when the vehicle is in the empty state.

An antenna device according to the second aspect of the present invention, wherein an antenna is used both for receiving remote control signals for remotely controlling a drive mounted on a vehicle and for receiving radio broadcast waves, is characterized by having a regulating means to regulate the length of the antenna projected outward from the vehicle body, a second detecting means to detect the occupied/empty state of the driver's seat of the vehicle, and a second control means to control the regulating means so that the length of the antenna becomes suitable for receiving remote control signals when the driver's seat is in the empty state.

An antenna device according to the third aspect o the present invention, wherein an antenna is used both for receiving remote control signals for remotely controlling a drive mounted on a vehicle and for receiving radio broadcast waves, is characterized by having a regulating means to regulate the length of the antenna projected outward from the vehicle body, a third detecting means to detect whether the engine is in the running state or not, and a third control means to control the regulating means so that the length of the antenna becomes suitable for receiving remote control signals when the engine is in the stop state.

An antenna device according to the fourth aspect of the present invention, wherein an antenna is used both for receiving remote control signals for remotely controlling a drive mounted on a vehicle and for receiving radio broadcast waves, is characterized by having a regulating means to regulate the length of the antenna projected outward from the vehicle body, a fourth detecting means to detect whether the ignition switch is in the on state or not, and a fourth control means to control the regulating means so that the length of the antenna becomes suitable for receiving remote control signals when the ignition switch is in the off state.

When the driver's seat is in the empty state, or the engine is in the stop state, or the ignition switch is in the off state, the possibility that the driver is not existent in the vehicle is high. Therefore, the need for the antenna to be used for remote control appears to be high.

In the antenna devices according to the second through fourth aspects of the present invention, by regulating the length of the antenna so as to make it suitable for receiving remote control signals, or shorter than the length suitable for receiving radio broadcast waves when the driver's seat is in the empty state, or the engine is in the stop state, or the ignition switch is in the off state, the possibility that the antenna is damaged by a touch with an obstacle, mischief and the like is reduced.

An antenna device according to the fifth aspect of the present invention, wherein an antenna is used both for receiving remote control signals for remotely controlling a drive mounted on a vehicle and for receiving radio broadcast waves, is characterized by having a regulating means to regulate the length of the antenna projected outward from the vehicle body, a first detecting means to detect the occupied/empty state of the vehicle, a fifth detecting means to detect whether the radio receiver is in the on state or not, and a fifth control means to control the regulating means so that the length of the antenna is regulated in accordance with the detection results from the first and fifth detecting means.

Using the antenna device according to the fifth aspect of the present invention, the projection length of the antenna from the body can be kept within the minimum required range since the projection length thereof is regulated to an appropriate length in accordance with the occupied/empty state of the vehicle and the on/off state of the radio receiver.

For example, when the maximum extended length of the antenna is 100 cm, the projection length of the antenna from the body is not kept 100 cm constantly. But as the state of things demands, the projection length of the antenna from the body can be regulated to 10 cm or 20 cm, or the antenna can be stowed away into the body (the projection length thereof is regulated to 0 cm).

As described above, by regulating the projection length of the antenna from the body as the state of things demands, so as to keep the projection length thereof within the minimum required range, the possibility that the antenna is damaged by a touch with an obstacle, mischief and the like can be reduced.

An antenna device according to the sixth aspect of the present invention, is characterized by the fifth control means, which controls the regulating means so that the length of the antenna becomes suitable for receiving remote control signals when the vehicle is in the empty state in the antenna device according to the fifth aspect of the present invention.

When the vehicle is in the empty state, the need for the antenna to be used for remote control is high, while the need for the antenna to be used for radio receiver appears to be low even when the radio receiver is in the on state, since there is no listener to the radio. Therefore, in this case, it is desirable that the length of the antenna should be set so as to become suitable for receiving remote control signals, or to become shorter than the length suitable for receiving radio broadcast waves.

Since the receiving frequency band in the keyless entry system (usually 300–400 MHz) is 3–4 times higher than the receiving frequency band of radio broadcasting (100 MHz and less) which is about one quarter to one third of the antenna length, as compared with the length of the antenna used for receiving radio broadcasting. It is sufficient to use the antenna as that for keyless entry system. For example, when a quarter-wave vertical earthed antenna (the maximum extended length of 100 cm) is used, the optimum antenna length for receiving a radio broadcast wave of 100 MHz is 75 cm, while the optimum antenna length for receiving a keyless signal of 300 MHz is 25 cm.

In the antenna device according to the sixth aspect of the present invention, the possibility that the antenna is damaged by a touch with an obstacle, mischief and the like is reduced by regulating the length thereof so as to make it suitable for receiving remote control signals, or by regulating the antenna length not to 75 cm, but to 25 cm when the vehicle is in the empty state.

An antenna device according to the seventh aspect of the present invention, according to the present invention, is characterized by the fifth control means, which controls the regulating means so that the length of the antenna becomes suitable for receiving radio broadcast waves when the vehicle is in the occupied state and the radio receiver is in the on state in the antenna device according to the fifth or sixth aspects of the present invention.

When the vehicle is in the occupied state and the radio receiver is in the on state, the antenna appears to rarely suffer mischief even if the length thereof is set to almost the maximum extended length (e.g. 70–100 cm). Therefore, in this case, the need to protect the antenna from mischief is low.

In the antenna device according to the seventh aspect of the present invention, a good receiving sensitivity to radio broadcast waves is ensured by regulating the length of the antenna to make it suitable for receiving radio broadcast waves when the vehicle is in the occupied state and the radio receiver is in the on state.

An antenna device according to the eighth aspect of the present invention, is characterized by the fifth control means, which controls the regulating means so that the antenna is stowed away into the vehicle body when the vehicle is in the occupied state and the radio receiver is in the off state in one of the antenna devices according to the fifth through seventh aspects of the present invention.

When the vehicle is in the occupied state, the need for the antenna to be used for remote control appears to be low. When the radio receiver is in the off state, the antenna is not needed as that for radio receiver.

When the vehicle is in the occupied state and the radio receiver is in the off state, it is desired that the antenna should be kept inside the body.

Using the antenna device according to the eighth aspect of the present invention, the antenna can be protected from damage caused by a touch with an obstacle, mischief of the wrong-minded, and the like. Since the antenna is stowed away into the body when the vehicle is in the occupied state and the radio receiver is in the off state.

An antenna device according to the ninth aspect of the present invention, wherein an antenna is used both for receiving remote control signals for remotely controlling a drive mounted on a vehicle and for receiving radio broadcast waves, is characterized by having a regulating means to regulate the length of the antenna projected outward from the vehicle body, a first detecting means to detect the occupied/empty state of the vehicle, a second detecting means to detect the occupied/empty state of the driver's seat of the vehicle, a fifth detecting means to detect whether the radio receiver is in the on state or not, and a sixth control means to control the regulating means so that the length of the antenna is regulated in accordance with the detection results from the first, second and fifth detecting means.

Using the antenna device-according to the ninth aspect of the present invention, the projection length of the antenna from the body can be kept within the minimum required range since the projection length thereof is regulated to an appropriate length in accordance with the occupied/empty state of the vehicle, the occupied/empty state of the driver's seat and the on/off state of the radio receiver.

An antenna device according to the tenth aspect of the present invention, wherein an antenna is used both for receiving remote control signals for remotely controlling a drive mounted on a vehicle and for receiving radio broadcast waves. It is characterized by having a regulating means to regulate the length of the antenna projected outward from the vehicle body, a fifth detecting means to detect whether the radio receiver is in the on state or not, a second detecting means to detect the occupied/empty state of the driver's seat of the vehicle, and a seventh control means to control the regulating means so that the length of the antenna is regulated in accordance with the detection results from the fifth and second detecting means.

Using the antenna device according to the tenth aspect of the present invention, the projection length of the antenna from the body can be kept within the minimum required range since the projection length thereof is regulated to an appropriate length in accordance with the on/off state of the radio receiver and the occupied/empty state of the driver's seat.

An antenna device according to the eleventh aspect of the present invention, wherein an antenna is used both for receiving remote control signals for remotely controlling a drive mounted on a vehicle and for receiving radio broadcast waves, is characterized by having a regulating means to regulate the length of the antenna projected outward from the vehicle body, a fifth detecting means to detect whether the radio receiver is in the on state or not, a third detecting means to detect whether the engine is running or not, and an eighth control means to control the regulating means so that the projection length of the antenna from the body is regulated in accordance with the detection results from the fifth and third detecting means.

Using the antenna device according to the eleventh aspect of the present invention, the projection length of the antenna from the body can be kept within the minimum required range since the projection length thereof is regulated to an appropriate length in accordance with the on/off state of the radio receiver and the running/stop state of the engine.

An antenna device according to the twelfth aspect of the present invention, wherein an antenna is used both for receiving remote control signals for remotely controlling a drive mounted on a vehicle and for receiving radio broadcast waves, is characterized by having a regulating means to regulate the length of the antenna projected outward from the vehicle body, a fifth detecting means to detect whether the radio receiver is in the on state or not, a fourth detecting means to detect whether the ignition switch is in the on state or not, and a ninth control means to control the regulating means so that the projection length of the antenna from the body is regulated in accordance with the detection results from the fifth and fourth detecting means.

Using the antenna device according to the twelfth aspect of the present invention, the projection length of the antenna from the body can be kept within the minimum required range since the projection length thereof is regulated to an appropriate length in accordance with the on/off state of the radio receiver and the on/off state of the ignition switch.

An antenna device according to the thirteenth aspect of the present invention, is characterized by the seventh, eighth, or ninth control means, which controls the regulating means so that the projection length of the antenna from the body becomes suitable for receiving radio broadcast waves when the radio receiver is in the on state in one of the antenna devices according to the tenth through twelfth aspects of the present invention.

When the radio receiver is in the on state, the probability that the antenna may suffer mischief appears to be low even if the projection length of the antenna from the body is set to almost the maximum extended length (e.g. 70–100 cm), since the possibility that someone is existent in the vehicle is high.

In the antenna device according to the thirteenth aspect of the present invention, a good receiving sensitivity to radio broadcast waves is ensured with priority by regulating the projection length of the antenna from the body to a length suitable for receiving radio broadcast waves when the radio receiver is in the on state.

An antenna device according to the fourteenth aspect of the present invention is characterized by the seventh, eighth or ninth control means, which controls the regulating means so that the antenna is stowed away into the vehicle body when the radio receiver is in the off state and, the driver's seat is in the occupied state, or the engine is in the running state, or the ignition switch is in the on state in one of the antenna devices according to the tenth through thirteenth aspects of the present invention.

When the driver's seat is in the occupied state, or the engine is in the running state, or the ignition switch is in the on state, the need for the antenna to be used for remote control appears to be low, since the possibility that the driver is existent in the vehicle is high. When the radio receiver is in the off state, the antenna is not required to be used for radio receiver.

When the radio receiver is in the off state and, the driver's seat is in the occupied state, or the engine is in the running state, or the ignition switch is in the on state, it is desired that the antenna should be kept inside the body.

Using the antenna device according to the fourteenth aspect of the present invention, when the radio receiver is in the off state and, the driver's seat is in the occupied state, or the engine is in the running state, or the ignition switch is in the on state, the antenna can be protected from damage caused by a touch with an obstacle, mischief of the wrong-minded, and the like since the antenna is kept inside the body.

An antenna device according to the fifteenth aspect of the present invention is characterized by the seventh, eighth, or ninth control means, which controls the regulating means so that the projection length of the antenna from the body becomes suitable for receiving remote control signals when the radio receiver is in the off state and, the driver's seat is in the empty state, or the engine is in the stop state, or the ignition switch is in the off state in one of the antenna devices according to the tenth through fourteenth aspects of the present invention.

When the driver's seat is in the empty state, or the engine is in the stop state, or the ignition switch is in the off state, the need for the antenna to be used for remote control appears to be high, since the possibility that the driver is not existent in the vehicle is high. When the radio receiver is in the off state, the antenna is not required to be used for radio receiver.

Therefore, in this case, it is desired that the projection length of the antenna from the body should be set to a length suitable for receiving remote control signals.

In the antenna device according to the fifteenth aspect of the present invention, when the radio receiver is in the off state and, the driver's seat is in the empty state, or the engine is in the stop state, or the ignition switch is in the off state, the possibility that the antenna is damaged by a touch with an obstacle, mischief and the like is reduced by regulating the projection length of the antenna from the body to a length suitable for receiving remote control signals.

An antenna device according to the sixteenth aspect of the present invention, is characterized by glass antennas adopted as antennas for receiving remote control signals for remotely controlling a drive mounted on a vehicle, which are arranged on at least two of the front, rear, left and right window glasses.

Using the antenna device according to the sixteenth aspect of the present invention, since the glass antennas as those for remote control are arranged on at least two of the front, rear, left and right window glasses of the vehicle, remote control signals can be received with a high probability.

An antenna device according to the seventeenth aspect of the present invention, is characterized by part of or all of the glass antennas for receiving remote control signals, which are also used as those for receiving radio broadcast waves in the antenna device according to the sixteenth aspect of the present invention.

Using the antenna device according to the seventeenth aspect of the present invention, since the glass antennas are used both for remote control and for radio receiver, the placement construction thereof can be simplified and the cost can be reduced.

An antenna device according to the eighteenth aspect of the present invention, is characterized by the drive, which performs the lock/unlock of the vehicle doors and the like in one of the antenna devices according to the first through seventeenth aspects of the present invention.

Using the antenna device according to the eighteenth aspect of the present invention, since part of the receiving circuits for keyless entry system for remotely controlling the lock/unlock of vehicle doors and the like are also used as those for radio receiver, the size of the automobile equipment control system, the placement space thereof and the cost can be reduced.

BRIEF DESCRIPTION OF THE DRAWINGS

FIG. 18 is a perspective view showing a vehicle on which glass antennas in an antenna device according to a fourth embodiment are arranged.

DETAILED DESCRIPTION OF THE PREFERRED EMBODIMENTS

Figure 5:
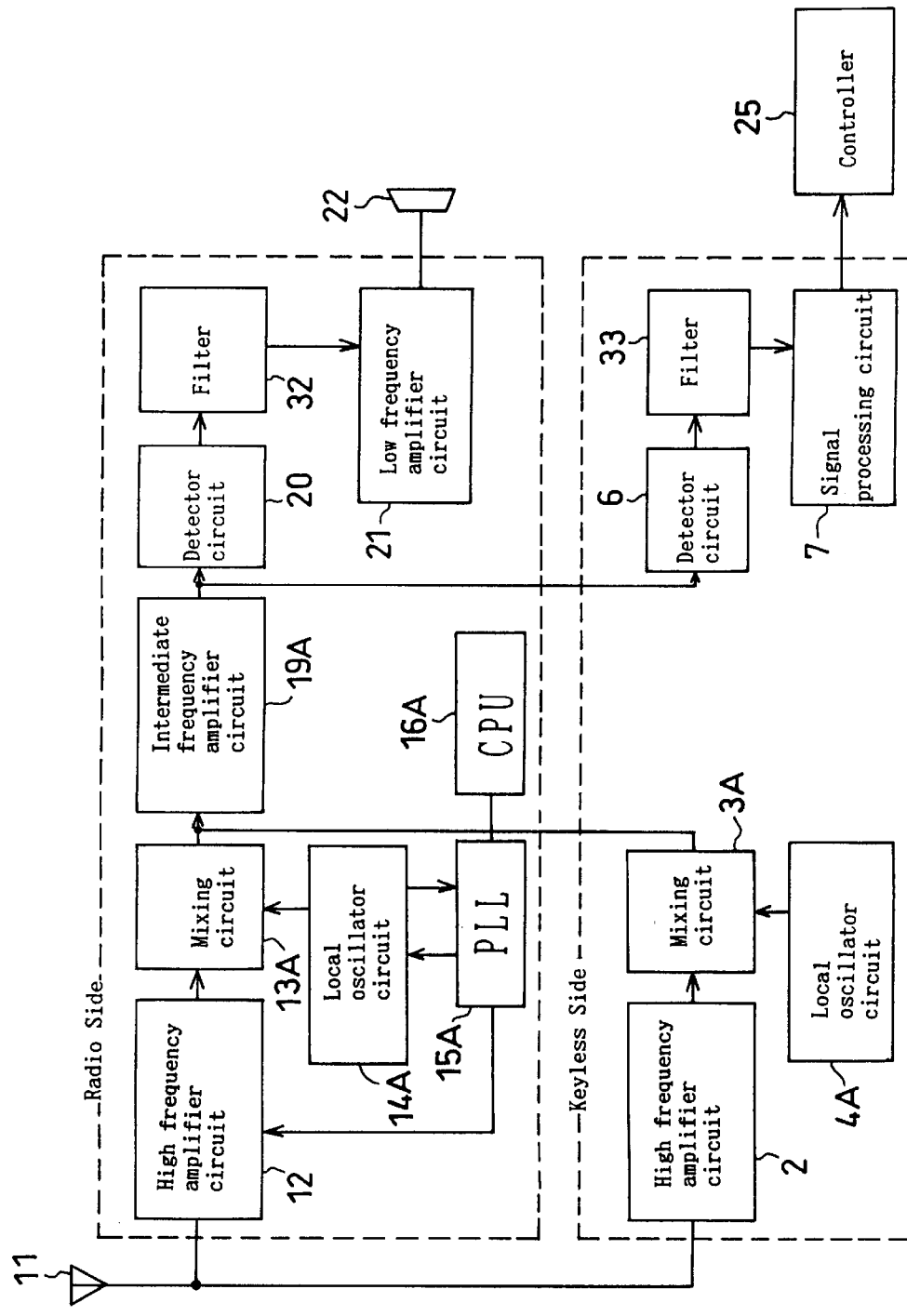
FIG. 5 is a block diagram schematically showing the principal part of a mobile receiver according to a first embodiment of the present invention.

The preferred embodiments of the mobile receiver, according to the present invention, are described below by reference to those Figures. FIG. 5 is a block diagram schematically showing a mobile receiver according to a first embodiment. Here, a carrier which carries a cipher code for directing the lock/unlocking of vehicle doors, trunks and the like is called a keyless signal.

An antenna 11 is used for receiving keyless signals for remotely controlling the lock/unlocking of doors and the like, and radio broadcast waves. A high frequency signal input into the antenna 11 is amplified in a high frequency amplifier circuit 2 (12). The amplified signal and the local oscillation signal from the local oscillator circuit 4A (14A) are mixed in a mixing circuit 3A (13A), and are taken as an intermediate frequency signal. The intermediate frequency signal from the mixing circuit 3A (13A) is amplified in an intermediate frequency amplifier circuit 19A. The amplified signal is detected (or a carrier is removed) in a detector circuit 6 (20) then, on the radio receiver side, a cipher code for keyless entry system is excluded by a filter 32. A radio broadcasting signal is amplified in a low frequency amplifier circuit 21 and is output through a speaker 22 as a voice. On the other hand, on the keyless entry system side, a radio broadcasting signal is excluded by a filter 33. A cipher code for keyless entry system is signal-processed in a signal processing circuit 7, and a controller 25 receives the processed signal from the signal processing circuit 7 to control a motor (not shown) or the like which drives the lock/unlocking of vehicle doors, trunk and the like. The filter 32 is used for taking voice signals comprising of low frequencies while the filter 33 is used for taking cipher codes for keyless entry system comprising of high frequencies.

A PLL circuit 15A performs the phase lock of the oscillation signal from the local oscillator circuit 14A under the control of a CPU 16A, so as to stabilize the intermediate frequency output signal from the mixing circuit 13A.

Using the mobile receiver according to the first embodiment, it is possible to receive keyless signals even while someone is listening to the radio in the vehicle, since the local oscillator circuits 14A and 4A (one for radio broadcasting and the other for keyless entry system) are separately arranged. Since the receiving frequency for keyless entry systems is a fixed frequency unlike that for radio broadcasting the rise time becomes shorter than when the local oscillation signal is directly generated using a SAW resonator or the like. This is advantageous to the intermittent receiving, resulting in a lower power consumption.

Figure 1:
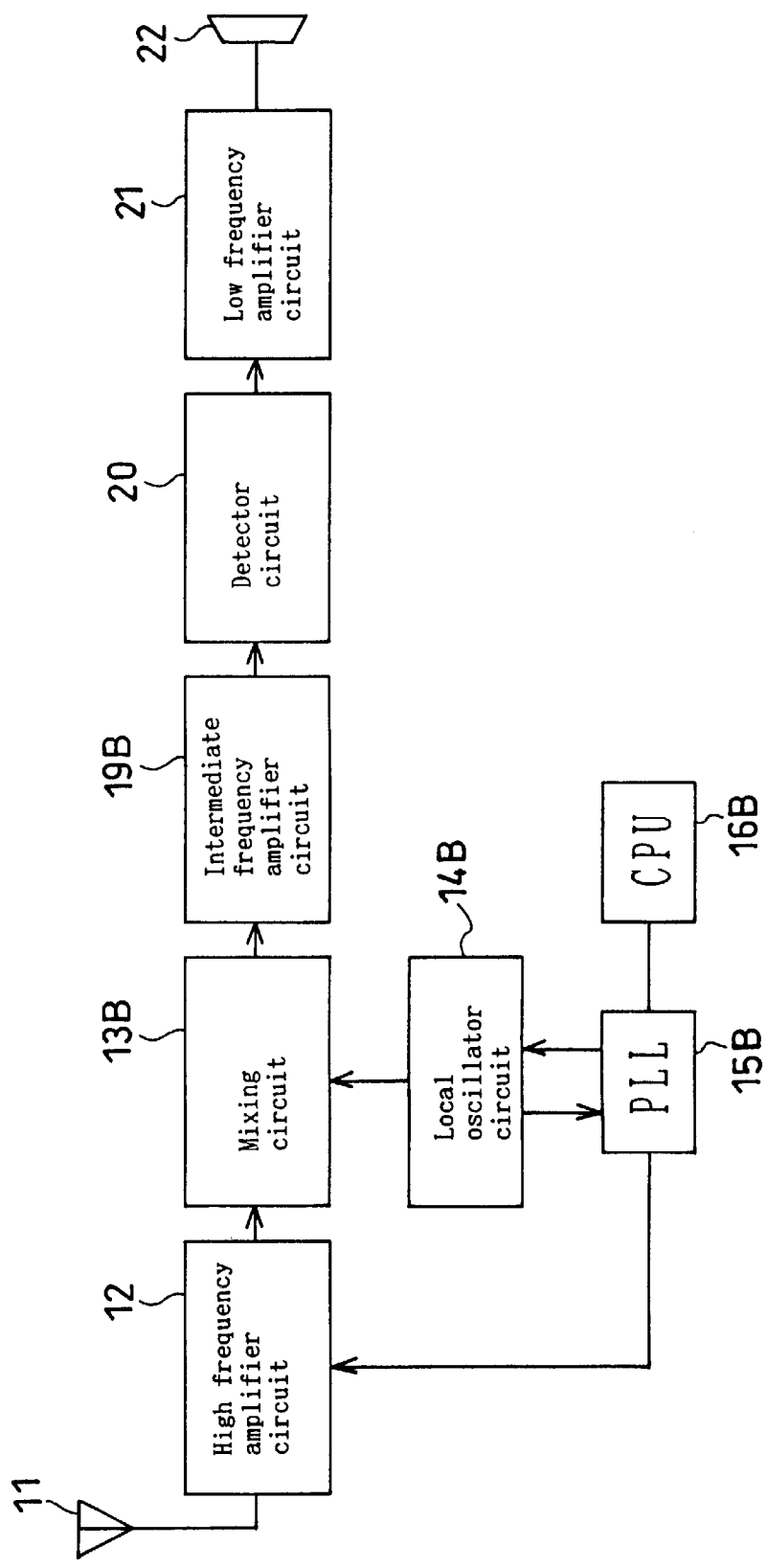
FIG. 1 is a block diagram schematically showing the principal part of a conventional radio receiver.
Figure 2:
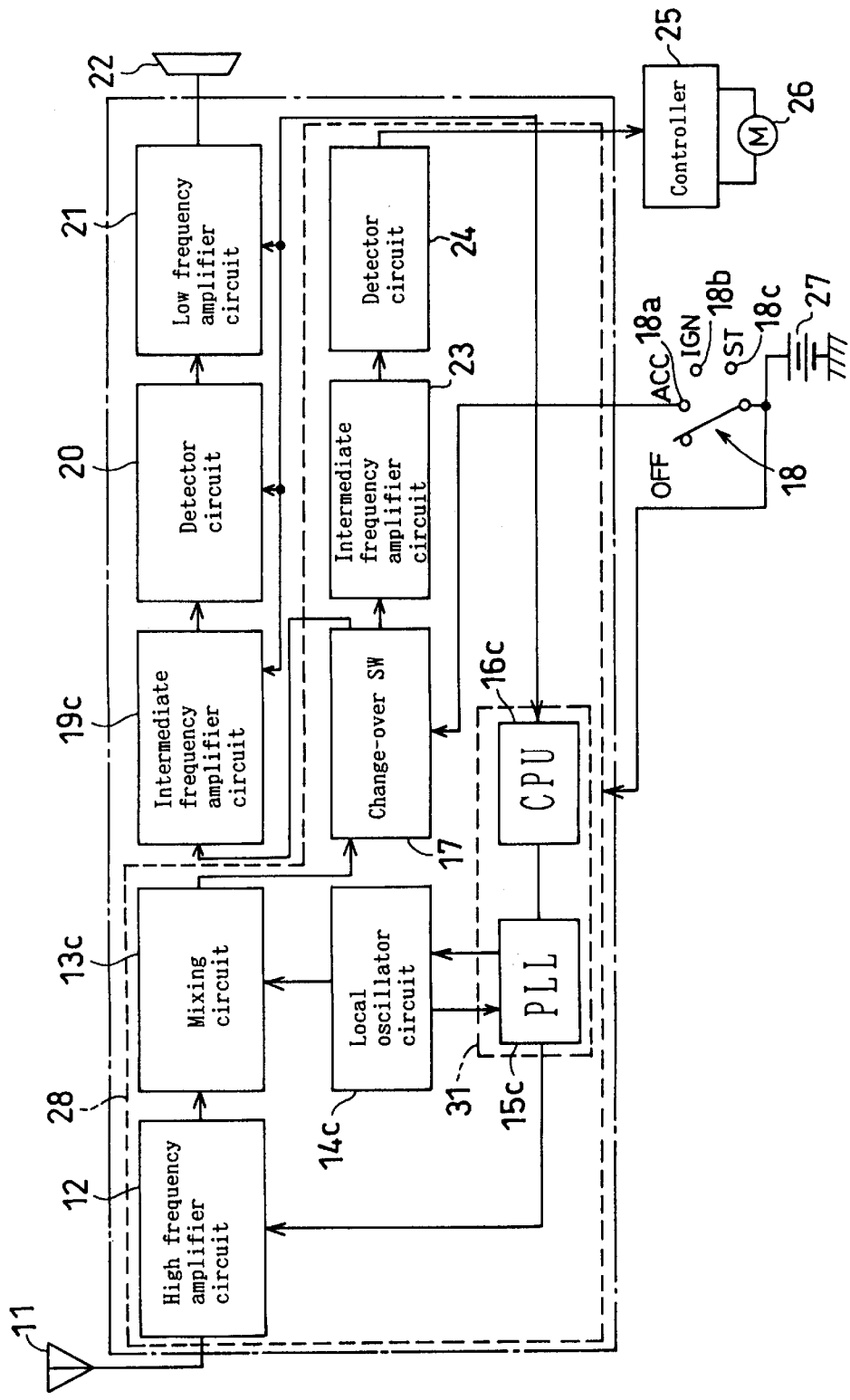
FIG. 2 is a block diagram schematically showing the principal part of a conventional mobile receiver.
Figure 3:
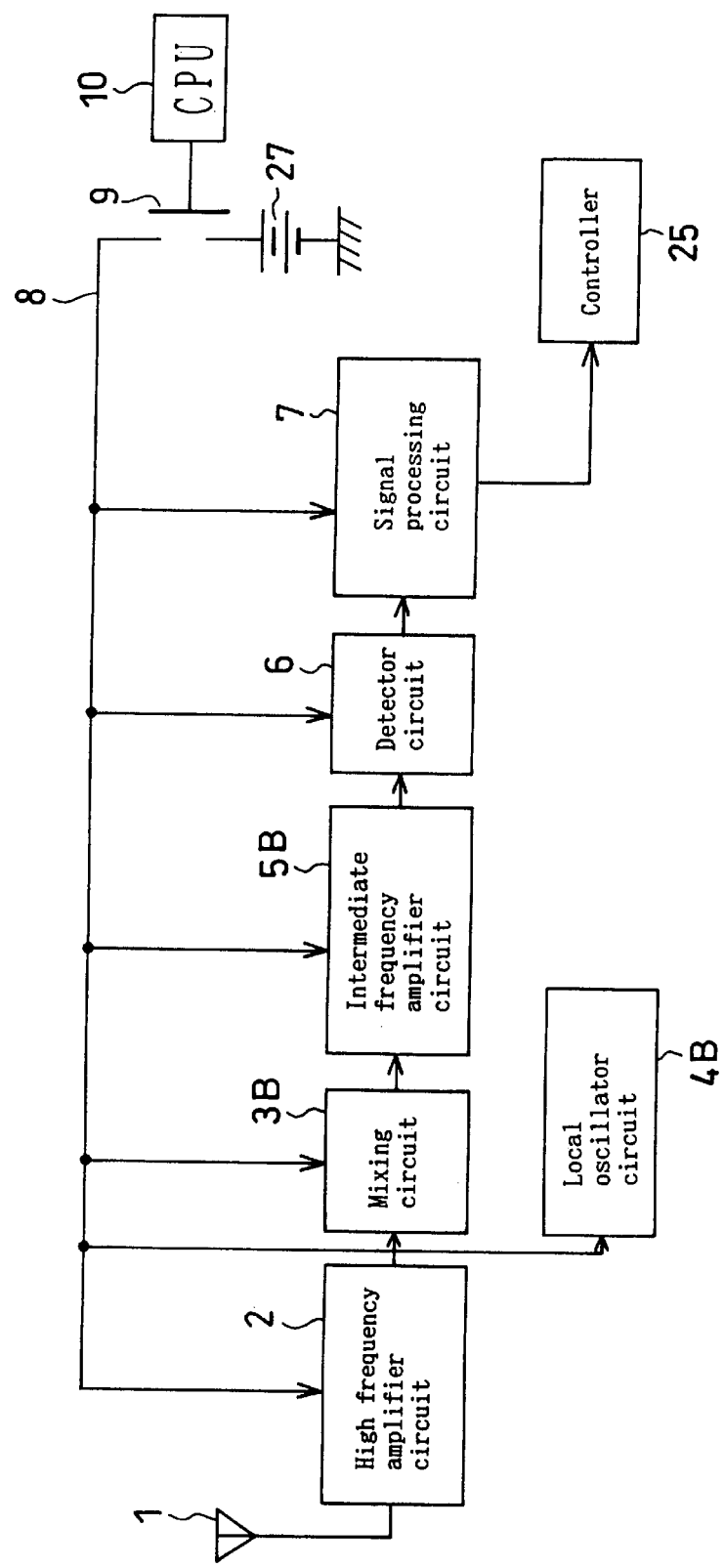
FIG. 3 is a block diagram schematically showing the principal part of a conventional receiver for keyless entry system.

The PLL circuit 15A is not required to be able to lock frequencies covering a wide range, unlike a PLL circuit 15C in FIG. 2, so that the problems of a higher cost and difficulty in tuning can be solved.

From the viewpoint of a lower power consumption, it is better that the mixing circuit 3A for keyless entry system should be adapted to the intermittent receiving, since the mixing circuit 3A, for keyless entry system is not required to keep receiving signals constant unlike the mixing circuit for radio broadcasting, and it is not required to keep being supplied with electric power constantly. It is better that the mixing circuit 3A for the keyless entry system should be a separate mixing circuit having a short rise time without being used as the mixing circuit 13A for radio broadcasting. It is not advised that the mixing circuit 13C should be used both for radio broadcasting and for the keyless entry system like in a conventional mobile receiver shown in FIG. 2.

In the mobile receiver of the first embodiment, the above problems are solved by separately arranging the mixing circuits 13A and 3A, one for radio broadcasting and the other for the keyless entry system. Since the mixing circuit 3A for the keyless entry system is not required to have very high performance, compared with the mixing circuit 13A for radio broadcasting, it is possible to make it have a simple circuit construction, whereby the power consumption therein can be kept as low as possible.

Using the mobile receiver of the first embodiment, even when both of the signals for the radio broadcasting and that for the keyless entry systems are input in parallel to the intermediate frequency amplifier circuit 19A without distinction between them. The signal for radio broadcasting and that for keyless entry system can be distinguished to be taken through the filters 32 and 33. The use of the intermediate frequency amplifier circuit 19A for both enables a reduction in cost.

Figure 6:
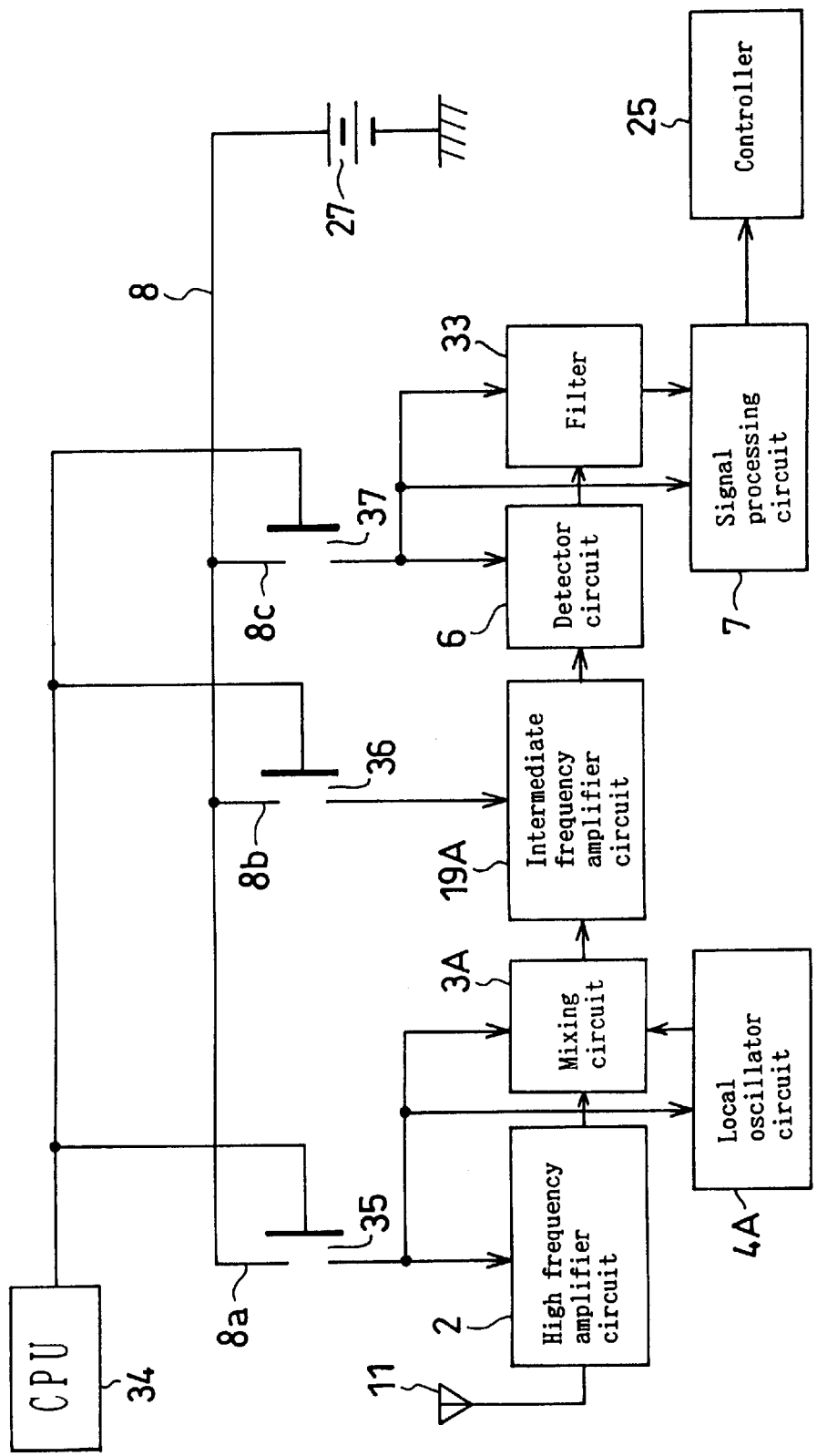
FIG. 6 is a block diagram showing a power supply system to each receiving circuit used for the keyless entry system of the mobile receiver according to the first embodiment.

FIG. 6 shows a power supply system for each receiving circuit used for the keyless entry system of the mobile receiver according to the first embodiment. Here, a high frequency amplifier circuit 12, a mixing circuit 13A, and the like which are used only for radio broadcasting are not shown in the figure.

Each receiving circuit used for the keyless entry system (high frequency amplifier circuit 2, mixing circuit 3A, local oscillator circuit 4A, intermediate frequency amplifier circuit 19A, detector circuit 6, filter 33, and signal processing circuit 7) is connected through a power line 8 for being supplied with electric power to a battery 27. These receiving circuits are divided into three groups corresponding to signal processing elements: a first group comprising of the high frequency amplifier circuit 2, mixing circuit 3A, and the local oscillator circuit 4A, a second group comprising of the intermediate frequency amplifier circuit 19A, and a third group comprising of the detector circuit 6, filter 33, and signal processing circuit 7.

The power lines 8a, 8b, and 8c for supplying electric power to the receiving circuits belonging to the first, second and third groups, respectively, switches 35, 36 and 37 are interposed. Each of the switches 35. 36 and 37 are make-and-break controlled by a CPU 34 (corresponding to a first control means) at a prescribed timing.

Figure 4:
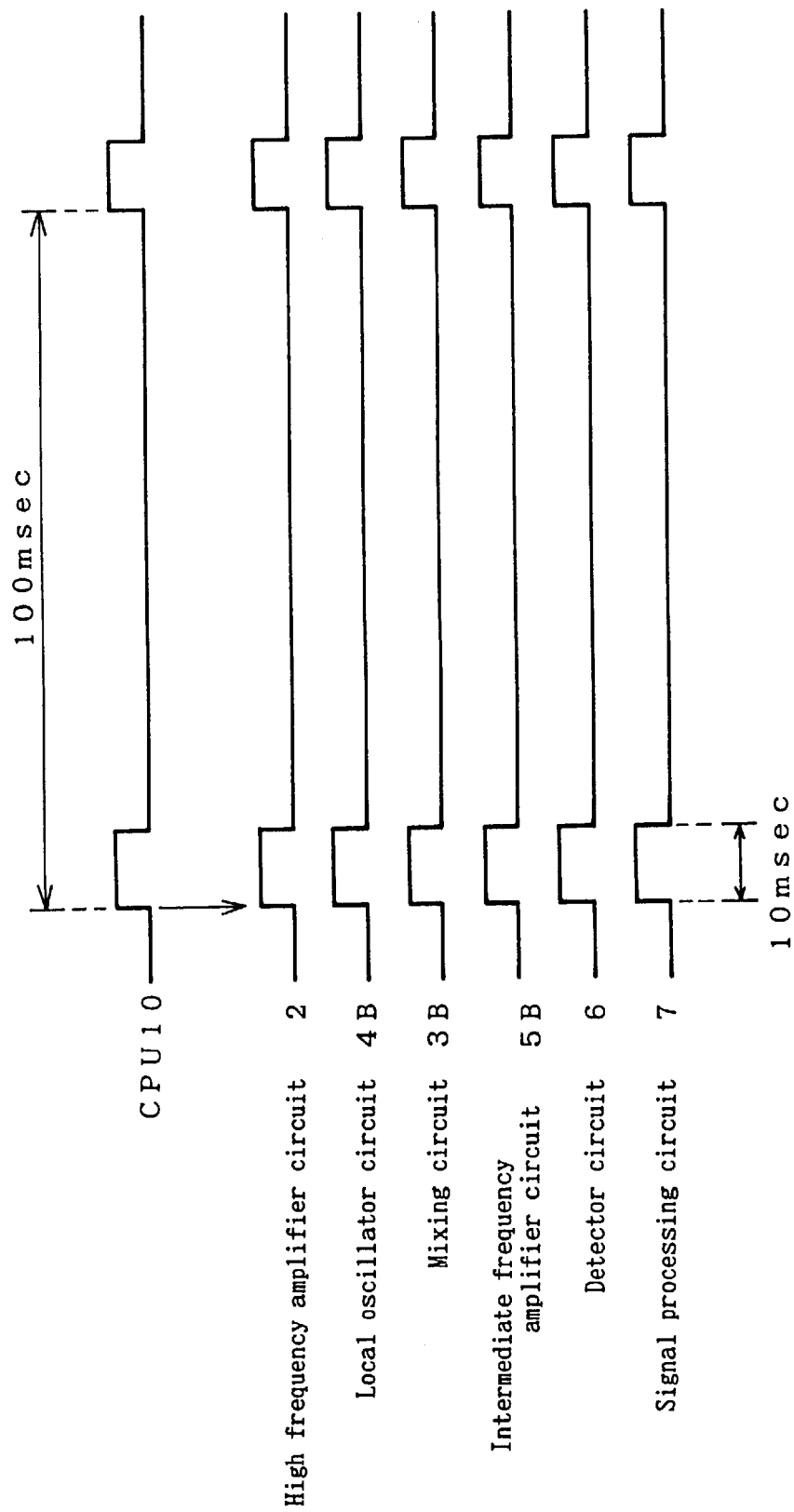
FIG. 4 is a timing chart showing an example of the relationship between the timing of control signals output from a CPU and that of the power supply to each receiving circuit in the keyless entry system shown in FIG. 3.
Figure 7:
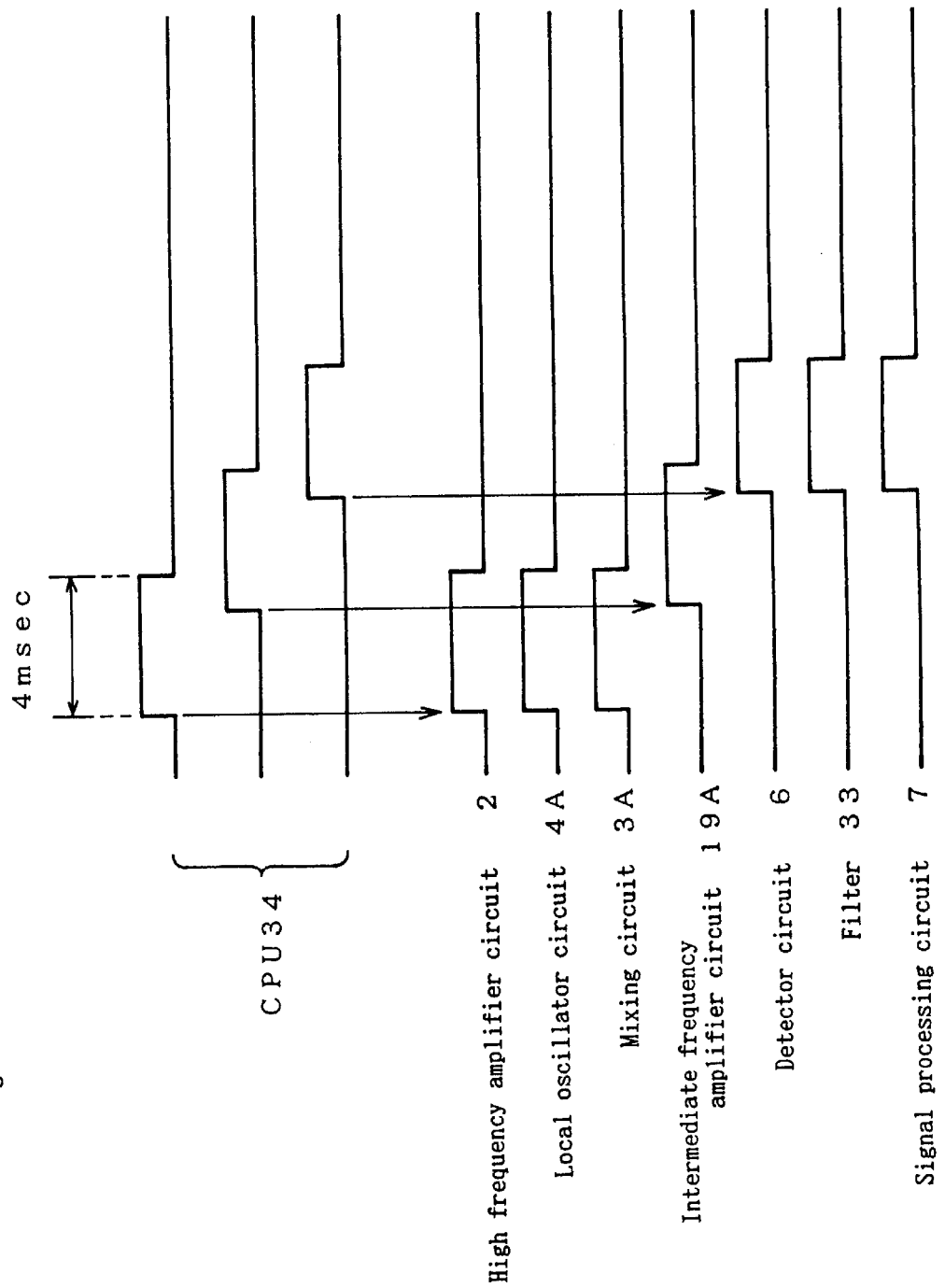
FIG. 7 is a timing chart showing an example of the relationship between the timing of the output of on/off control signals from a CPU and that of the power supply to each receiving circuit in the mobile receiver according to the first embodiment.

FIG. 7 is a timing chart showing an example of the relationship between the timing of the output of on/off signals from the CPU 34 and that of the power supply to each receiving circuits. The switches 35, 36 and 37 are intermittently make-and-break controlled in sequence by the CPU 34, and every receiving circuit is supplied with electric power for 4 msec at a time. As is obvious from FIG. 7, the electrical supply time to each receiving circuit can be made shorter than before (see FIG. 4) by grouping the receiving circuits. As a result, the total power consumption in the circuits are sharply reduced.

Figure 8:
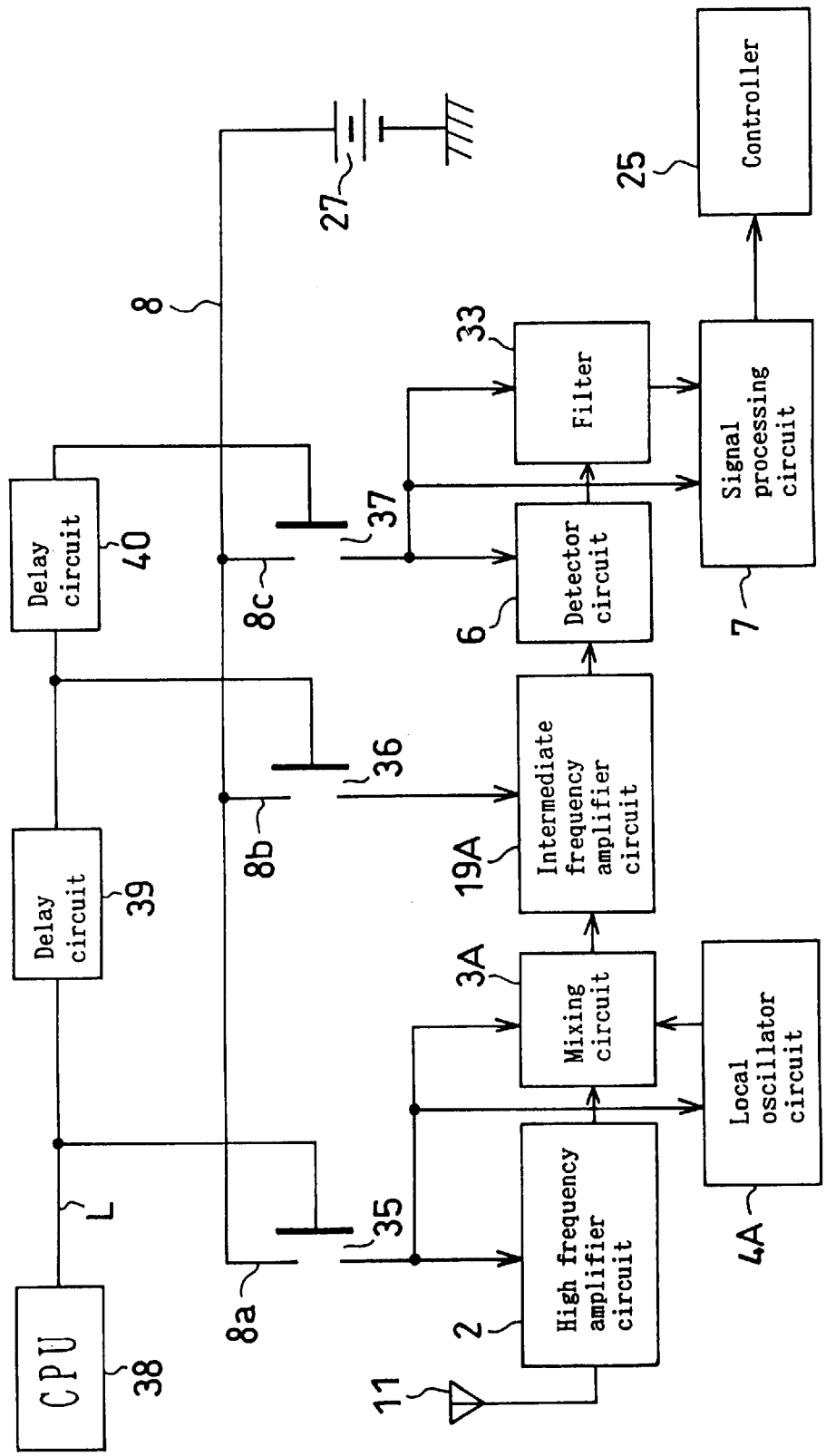
FIG. 8 is a block diagram showing a power supply system to each receiving circuit used for the keyless entry system of a mobile receiver according to a second embodiment.

FIG. 8 shows a power supply system to each receiving circuit used for the keyless entry system of a mobile receiver according to a second embodiment. Here, a high frequency amplifier circuit 12, mixing circuit 13A and the like used only for radio broadcasting are not shown in the figure, and the description of the similar construction to the mobile receiver shown in FIG. 6 is omitted.

In power lines 8a, 8b and 8c for supplying electric power to receiving circuits belonging to the first, second and third groups, respectively, switches 35. 36 and 37 are interposed. Each of the switches 35, 36 and 37 are connected through a control line L to a CPU 38 (corresponding to a second control means).

Delay circuits 39 and 40 are interposed in the control line L which transmits an on/off control signal output from the CPU 38 to the switches 35, 36 and 37. The on/off control signal is transmitted to the receiving circuits belonging to the second and third groups with a prescribed delay after the signal reaches the receiving circuits belonging to the first group.

Figure 9:
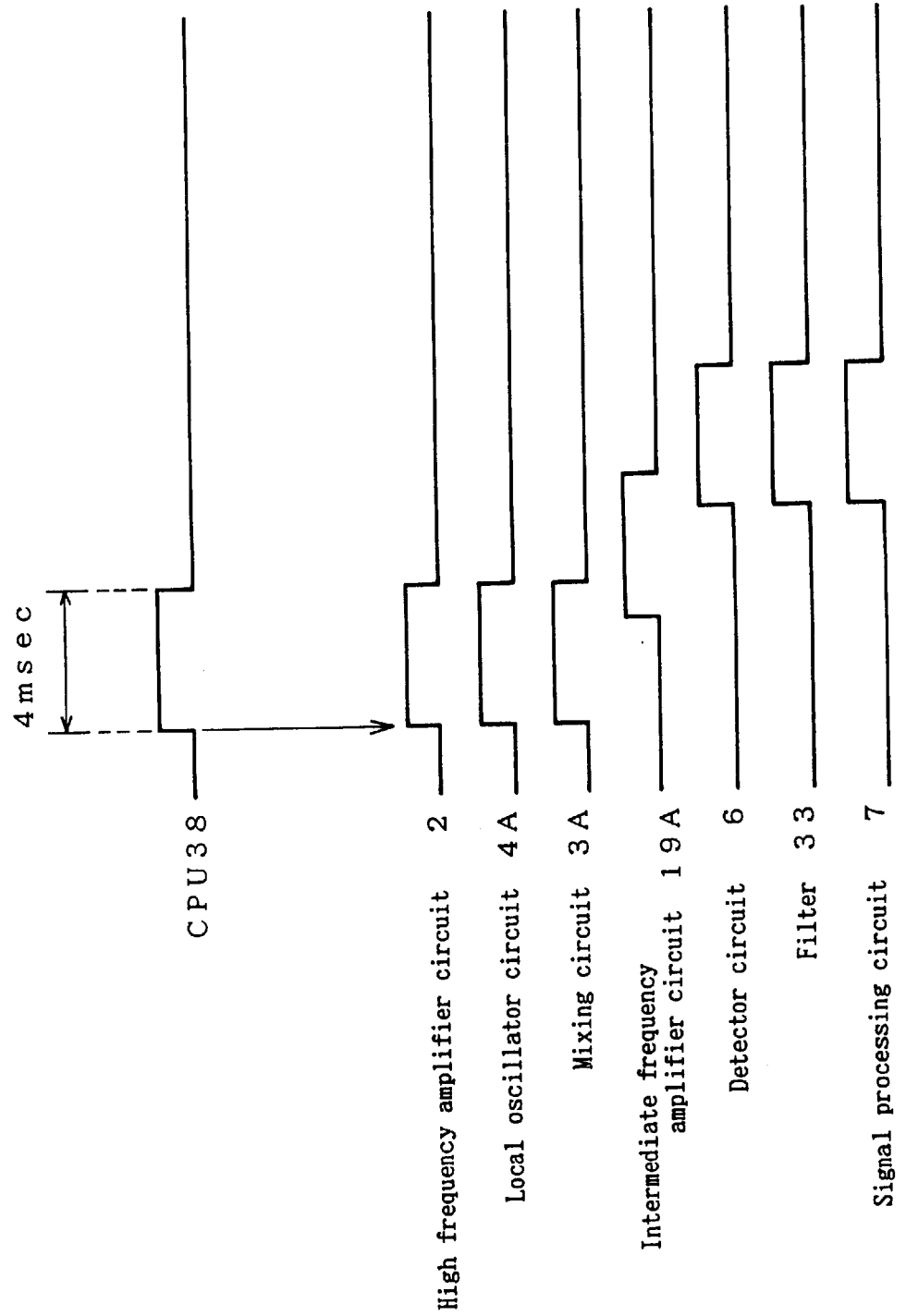
FIG. 9 is a timing chart showing an example of the relationship between the timing of the output of an on/off control signal from a CPU and that of the power supply to each receiving circuit in the mobile receiver according to the second embodiment.

FIG. 9 is a timing chart showing an example of the relationship between the timing of the output of an on/off control signal from the CPU 38 and that of the power supply to each receiving circuits. Switches 35, 36 and 37 are intermittently make-and-break controlled in sequence by the CPU 38 and delay circuits 39 and 40, and every receiving circuit is supplied with electric power for 4 msec at a time. As is obvious from FIG. 9, the electrical supply time to each receiving circuit can be made shorter than before (see FIG. 4) by grouping the receiving circuits. As a result, the total power consumption in the circuits is sharply reduced. By interposing the delay circuits 39 and 40, only one control signal from the CPU 38 is required as before, resulting in simplified control.

Figure 10:
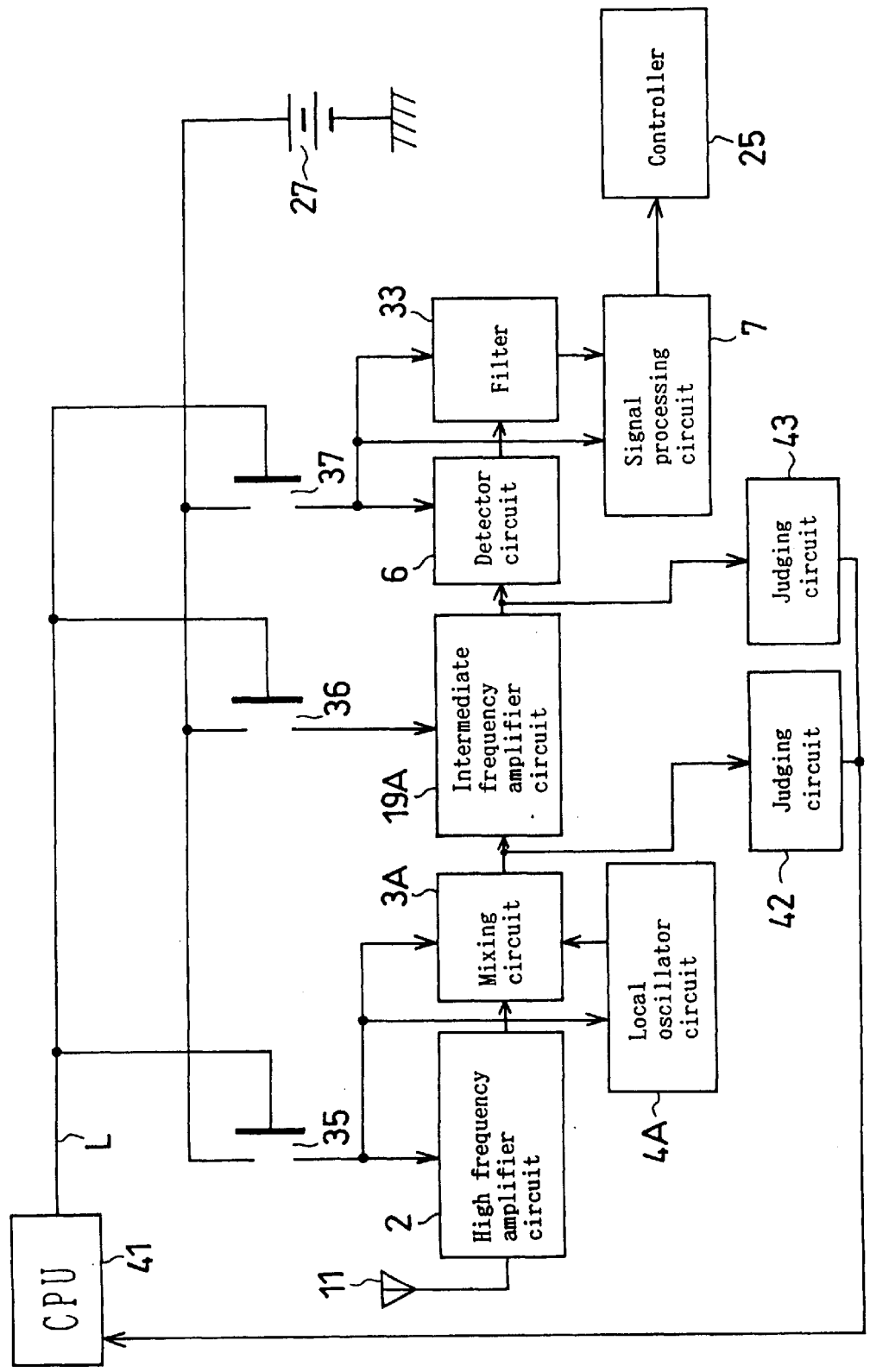
FIG. 10 is a block diagram showing a power supply system to each receiving circuit used for the keyless entry system of a mobile receiver according to a third embodiment.

FIG. 10 shows a power supply system to each receiving circuit used for the keyless entry system of a mobile receiver according to a third embodiment. Here, a high frequency amplifier circuit 12, mixing circuit 13A and the like used only for radio broadcasting are not shown in the figure, and the description of the similar construction to the mobile receiver shown in FIG. 6 is omitted.

In power lines 8a, 8b and 8c for supplying electric power to receiving circuits belonging to the first, second and third groups, respectively, switches 35, 36 and 37 are interposed. Each of the switches 35, 36 and 37 are connected through a control line L to a CPU 41 (corresponding to a third control means).

Judging circuits 42 and 43 are used for judging whether a keyless signal is existent or not in the output signals from the mixing circuit 3A and from the intermediate frequency amplifier circuit 19A, respectively. The judgement results are output to the CPU 41, which makes each of the switches 36 and 37 turned on/off in accordance with the judgement results.

The CPU 41 makes the switch 35 turned on, controls the switch 36 so as to be turned on in the case wherein it is judged in the judging circuit 42 that a keyless signal exists in the output from the mixing circuit 3A. Furthermore, it controls the switch 37 so as to be turned on in the case wherein it is judged in the judging circuit 43 that a keyless signal exists in the output from the intermediate frequency amplifier circuit 19A.

Figure 11:
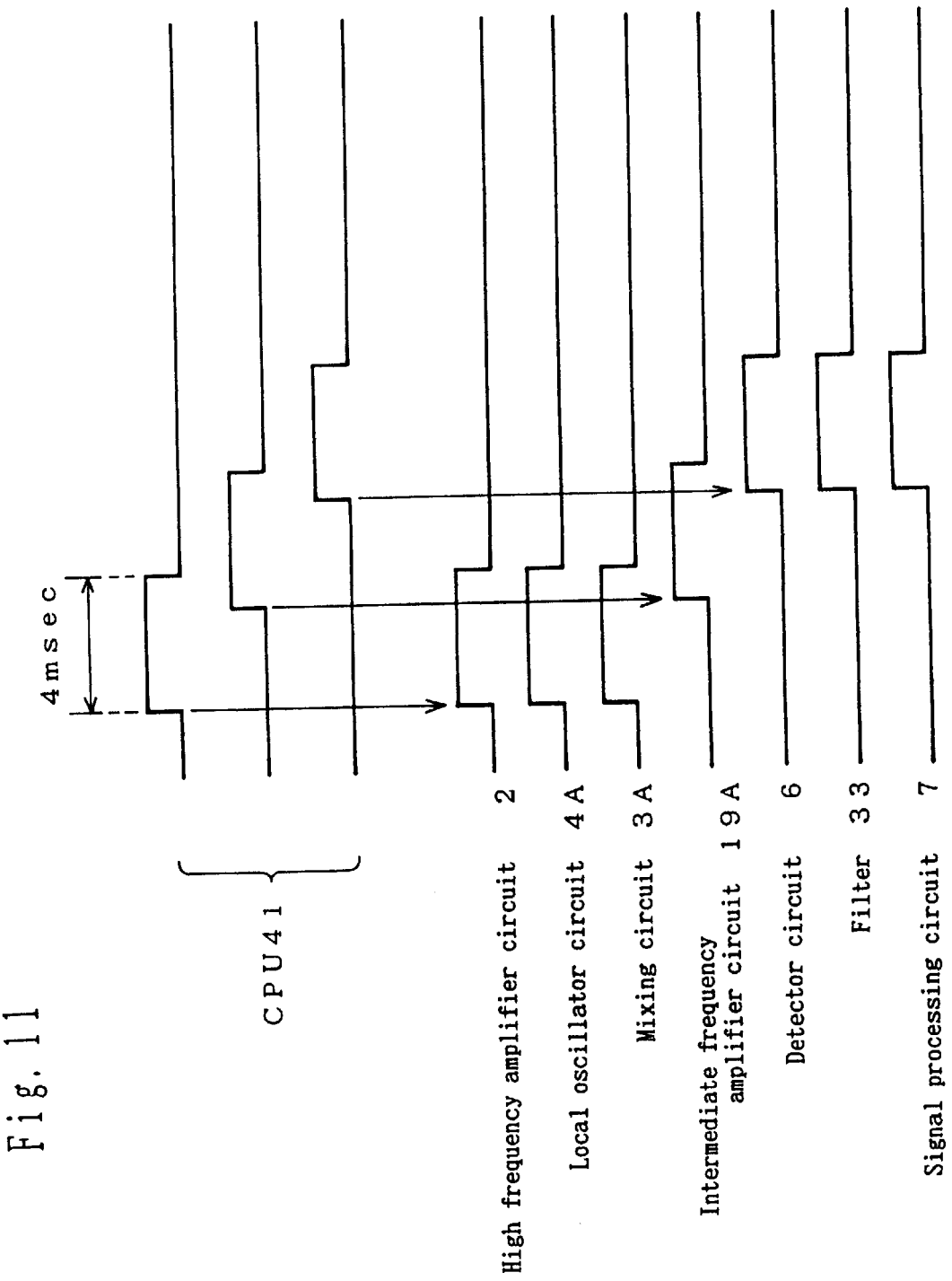
FIG. 11 is a timing chart showing an example of the relationship between the timing of the output of on/off control signals from a CPU and that of the power supply to each receiving circuit in the mobile receiver according to the third embodiment.

FIG. 11 is a timing chart showing an example of the relationship between the timing of the output of on/off control signals from the CPU 41 and that of the power supply to each receiving circuit. The switches 35, 36 and 37 are intermittently make-and-break controlled in sequence by the CPU 41 and judging circuits 42 and 43. Every receiving circuit is supplied with electric power for 4 msec at a time. As is obvious from FIG. 11, the electrical supply time to each receiving circuit can be made shorter than before (see FIG. 4) by grouping the receiving circuits. As a result, the total power consumption in the circuits is sharply reduced. And using the mobile receiver of the third embodiment, it is possible to start up the minimum required receiving circuits in order, so that waste of power consumption can be further cut.

Figure 12:
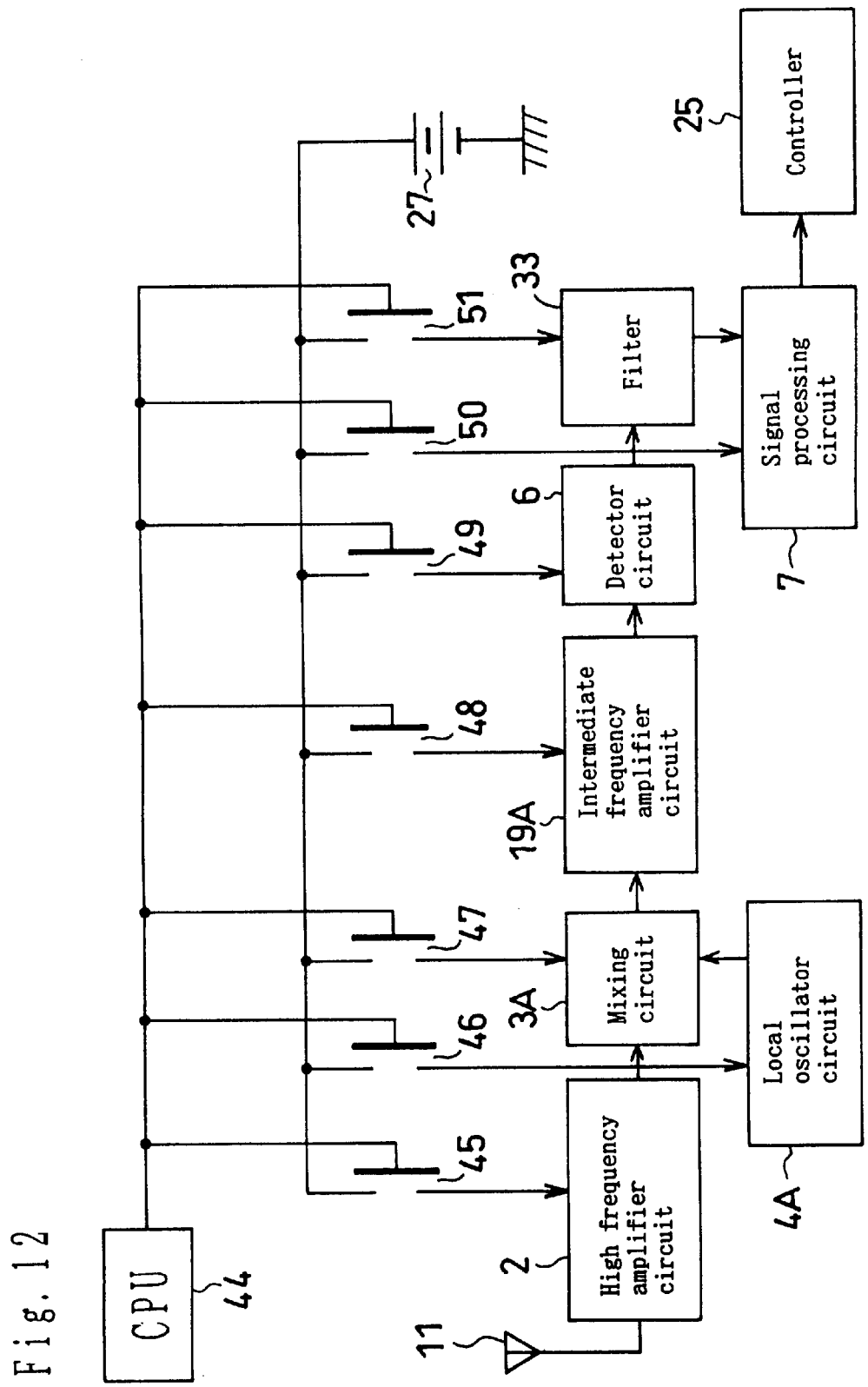
FIG. 12 is a block diagram showing another example of a power supply system to each receiving circuit used for the keyless entry system of the mobile receiver according to the first embodiment.

In the mobile receivers according to the first through third embodiments, only the case wherein the receiving circuits are divided into three groups is described, but it is not limited to the grouping into three. As shown in FIG. 12, for example, receiving circuits may be connected through switches 45–51 interposed in the power lines to each of the receiving circuits to a CPU 44, whereby the switches 45–51 are controlled. In this case, though the wiring of the whole circuits becomes a little complicated, the power consumption can be drastically reduced.

In any of the mobile receivers according to the embodiments, as a drive in the description, the drive to perform the lock/unlocking of vehicle doors, trunks and the like is exemplified. But the drive is not limited to that. The drive to perform the opening/closing of mirrors and or the starting/stopping of the engine may be available.

The preferred embodiments of the antenna device according to the present invention are described below by reference to those Figures.

Figure 13:
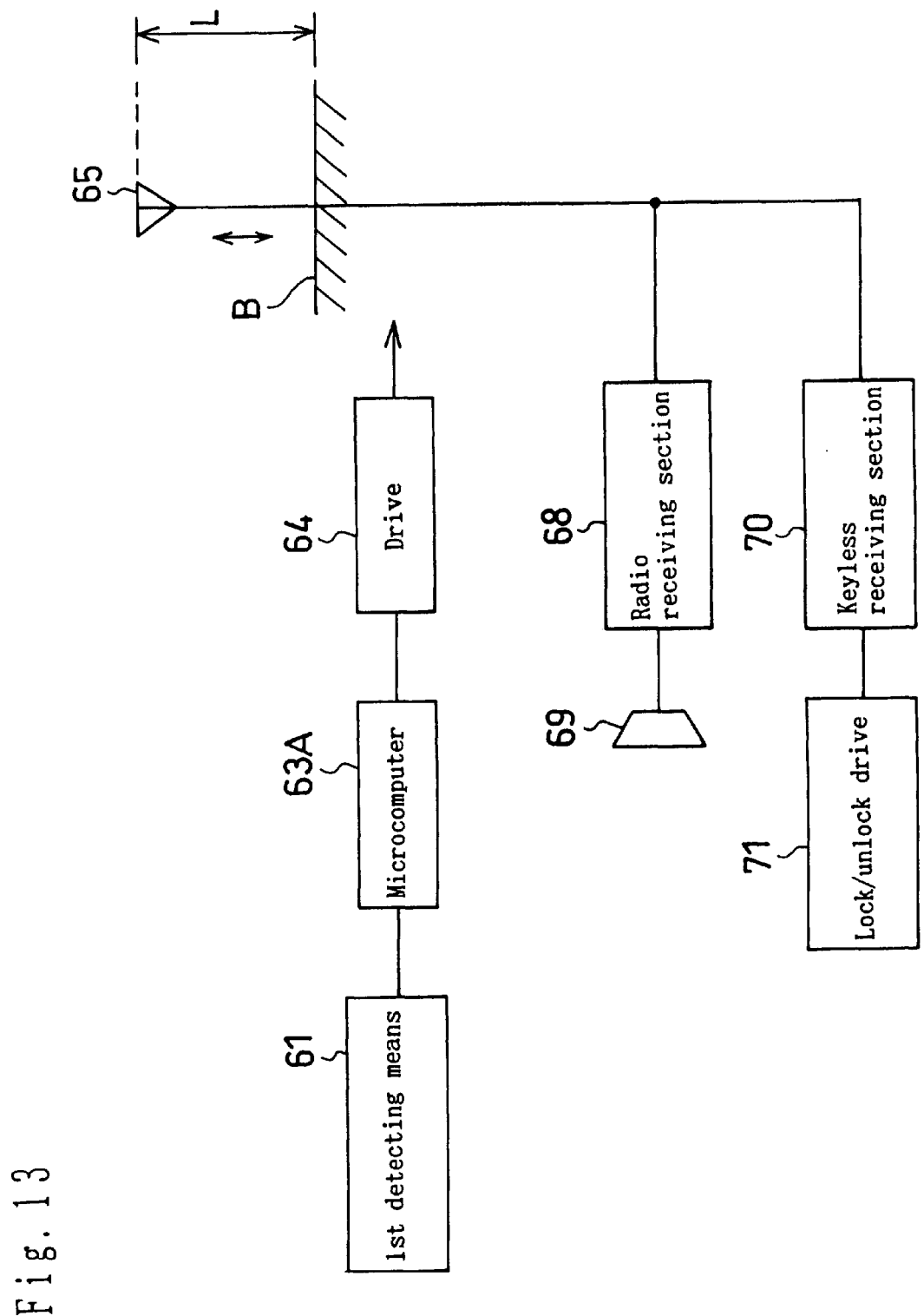
FIG. 13 is a block diagram schematically showing the principal part of an antenna device according to the first embodiment of the present invention.

FIG. 13 is a block diagram schematically showing the principal part of an antenna device according to a first embodiment. Here, an antenna device wherein an antenna is used both for keyless entry system for remotely controlling the lock/unlocking of vehicle doors, trunk and the like and for radio broadcasting is described.

A first detecting means 61 to detect the occupied/empty state of a vehicle is connected to a microcomputer (corresponding to a first control means) 63A, which is connected to a drive (corresponding to a regulating means) 64. The drive 64, which makes a telescopic pipe for lengthening and shortening a pole antenna 65 projected from the vehicle body shell B vertically move, comprises a motor which responds to a pulse signal from the microcomputer 63A to revolve in proportion to the length of the pulse. The first detecting means 61 comprises an infrared sensor, a load sensor or the like. It can be judged that no one is existent in any seat, based on the infrared reflection state on every seat in the vehicle or the total vehicle weight.

The pole antenna 65 is used for receiving keyless signals for remotely controlling the lock/unlock of vehicle doors, trunk, and the like, and radio broadcast wave. A radio broadcast wave input to the pole antenna 65 is signal-processed in a radio receiving section 68, and is output through a speaker 69 as a voice. On the other hand, a keyless signal input to the pole antenna 65 is signal-processed in a keyless receiving section 70, and is output from the keyless receiving section 70 to a drive 71 to perform the lock/unlocking of vehicle doors and the like as a control signal.

The operation of the microcomputer 63A in the antenna device according to the first embodiment is described in the description. The maximum extended length of the pole antenna 65 is 100 cm, and the optimum antenna length L for receiving keyless signals is 25 cm.

The microcomputer 63A captures a signal indicating the occupied/empty state of the vehicle from the first detecting means 61. When a judgement that the vehicle is in the empty state is made, it outputs a pulse signal having a pulse length corresponding to 25 cm to control the drive 64 so that the antenna length L becomes 25 cm.

When the vehicle is in the empty state, the need for the pole antenna 65 to be used for remote control is high. Even when the radio receiver is in the on state, there is no listener to the radio. Then the need for the pole antenna 65 to be used for radio broadcasting appears to be low. Therefore, in this case, it is desired that the length of the pole antenna 65 should be set to a length suitable for receiving remote control signals.

In the antenna device according to the first embodiment, by regulating the length of the pole antenna 65 to a length suitable for receiving remote control signals when the vehicle is in the empty state, the pole antenna 65 is protected from damage caused by a touch with an obstacle, mischief and the like, so that the possibility that the pole antenna 65 is damaged is reduced.

Here, the case wherein the length of the pole antenna 65 is regulated in accordance with the occupied/empty state of the vehicle is described above, but as another detecting means, a detecting means to detect the occupied/empty state of the driver's seat, or the running/stop state of the engine, or the on/off state of the ignition switch may be adopted so that the length of the pole antenna 65 is regulated to a length suitable for receiving remote control signals when the driver's seat is in the empty state, or the engine is in the stopped state, or the ignition switch is in the off state. The construction enables the same effect as that of the antenna device of the first embodiment to be obtained.

In order to detect the absence of a person in the driver's seat an infrared sensor, a load sensor, or the like which is applied to the driver's seat may be adopted. In order to detect the stop state of the engine, the microcomputer 63A may be caused to capture the information of the revolution number of the engine (when the revolution number thereof is 0, it makes a judgement that the engine is in the stop state). In order to detect the off state of the ignition switch the microcomputer 63A may be caused to capture the on/off signal depending on the connection state of the switch.

Figure 14:
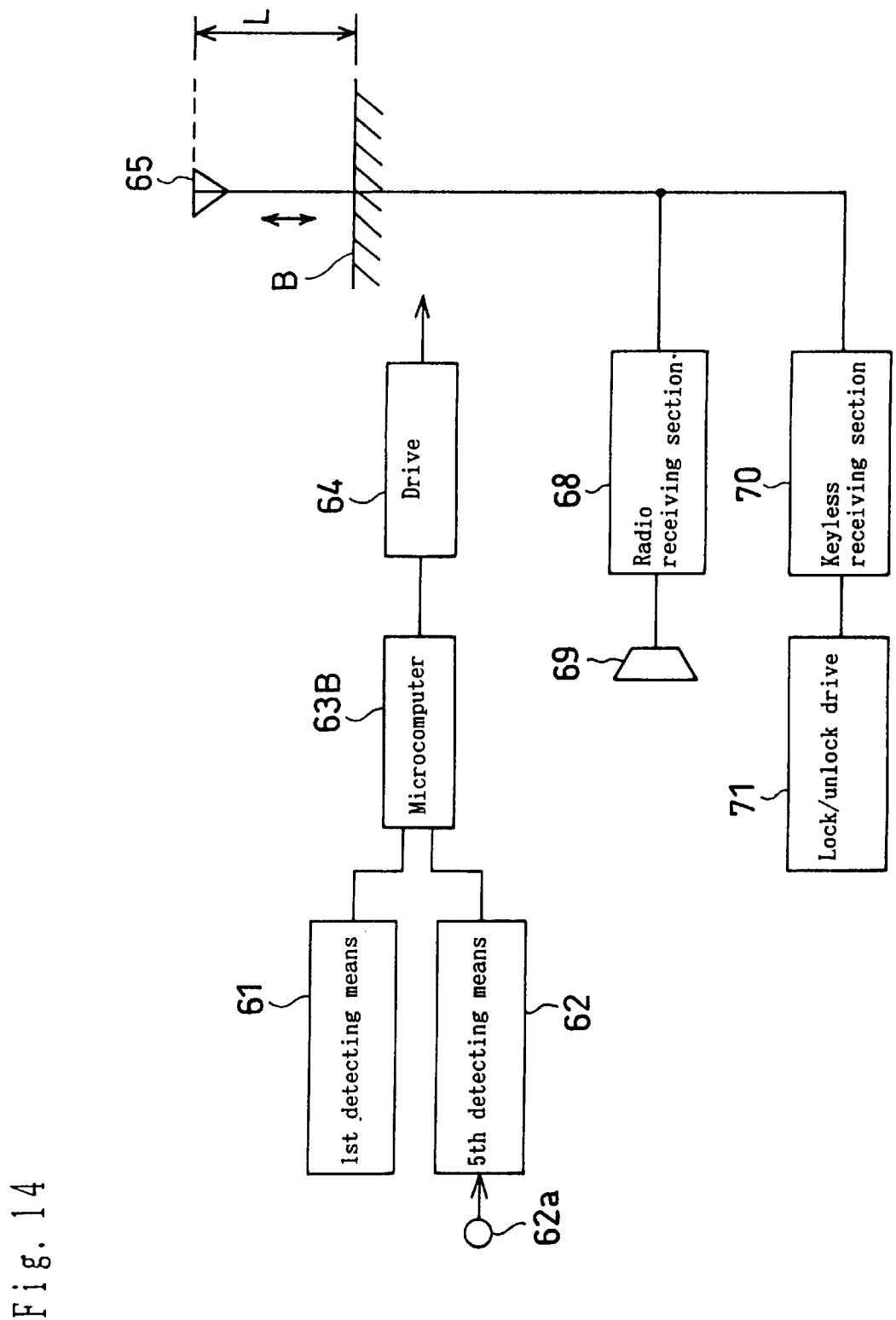
FIG. 14 is a block diagram schematically showing the principal part of an antenna device according to the second embodiment.

FIG. 14 is a block diagram schematically showing the principal part of an antenna device according to a second embodiment. Here, the description of the same construction as that of the antenna device shown in FIG. 13 is omitted.

A fifth detecting means 62 to detect the on/off state of a power switch 62a on the radio receiver side and a first detecting means 61 to detect the occupied/empty state of the vehicle are connected to a microcomputer (corresponding to a fifth control means) 63B, which is connected to a drive (corresponding to a regulating means) 64. The drive 64, which makes a telescopic pipe for lengthening and shortening a pole antenna 65 projected from the vehicle body shell B vertically move, is comprised of a motor which responds to a pulse signal from the microcomputer 63B to revolve in proportion to the length of the pulse.

Figure 15:
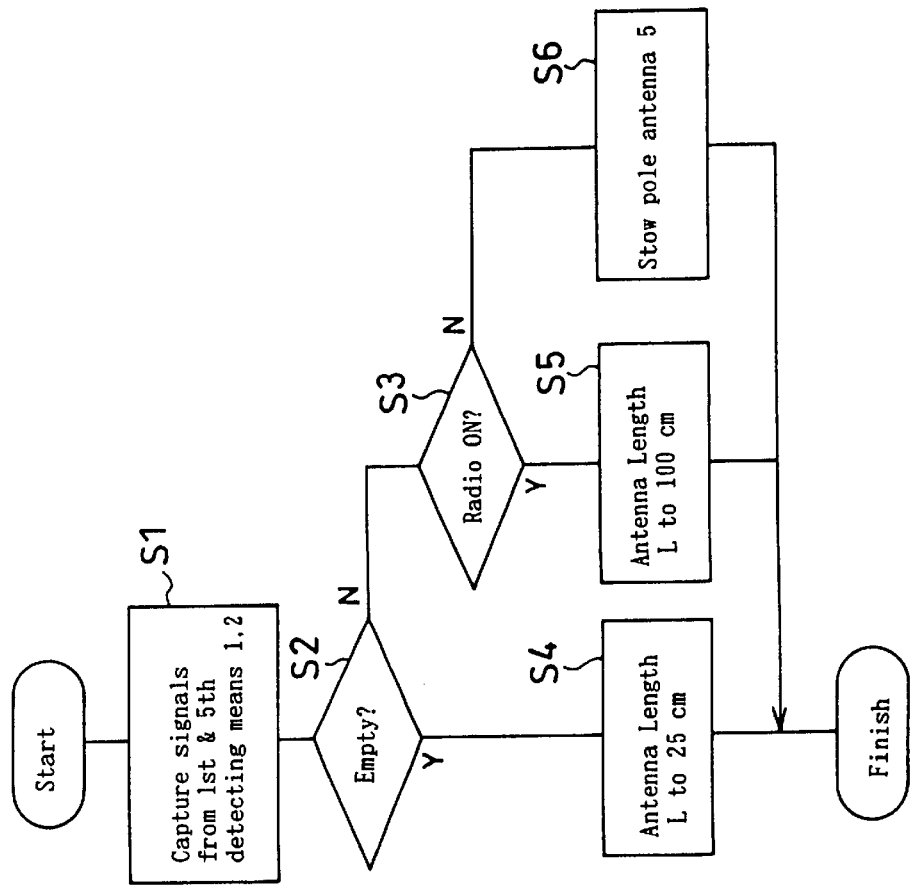
FIG. 15 is a flowchart showing the operation of a microcomputer in the antenna device according to the second embodiment.

The operation of the microcomputer 63B in the antenna device according to the second embodiment is described by reference to a flowchart shown in FIG. 15. Here, in the description, the maximum extended length of the pole antenna 65 is 100 cm, and the optimum antenna length L for receiving keyless signals is 25 cm.

At step 1, the microcomputer 63B captures signals indicating the occupied/empty state of the vehicle and the on/off state of the radio receiver power switch 62a from the first detecting means 61 and the fifth detecting means 62, going to step 2.

At step 2, it judges whether the vehicle is in the empty state or not. When it makes a judgement that the vehicle is in the empty state, it moves to step 4. It outputs a pulse signal having a pulse length corresponding to 25 cm to control the drive 64 so that the antenna length L becomes 25 cm. On the other hand, when it makes a judgement that the vehicle is in the occupied state, it moves to step 3.

At step 3, it judges whether the radio receiver power switch 62a is in the on state or not. When it makes a judgement that the switch is in the on state, it moves to step 5. It outputs a pulse signal having a pulse length corresponding to 100 cm to control the drive 64 so that the antenna length L becomes 100 cm, the maximum extended length. On the other hand, when it makes a judgement that the switch is in the off state, it moves to step 6. It outputs a pulse signal to control the drive 64 so that the pole antenna 65 is stowed away into the body.

Using the antenna device according to the second embodiment, since the antenna length L of the pole antenna 65 projected outward from the vehicle body is appropriately regulated in accordance with the occupied/empty state of the vehicle and the on/off state of the radio receiver power switch 62a so as to keep the antenna length L within the minimum required range, the antenna can be protected from damage caused by a touch with an obstacle, mischief and the like, so that the possibility that the pole antenna 65 is damaged can be reduced.

The control at the step 4, 5, or 6 is adapted to the below-described cases, respectively.

Case 1: The case wherein the vehicle is in the empty state

The need for the pole antenna 65 to be used for keyless entry system is high.

Therefore, in Case 1, it is desired that the length L of the pole antenna 65 should be made a length suitable for receiving keyless signals (25 cm), not 100 cm.

Case 2: The case wherein the vehicle is in the occupied state and the radio receiver power switch 62a is in the on state When the vehicle is in the occupied state, the risk of suffering mischief is low;

the need to protect the pole antenna 65 from mischief is low; and so it is possible to regulate the antenna length L to the maximum extended length (100 cm).

When the radio receiver power switch 62a is in the on state.

the need for the pole antenna 65 to be used for radio broadcasting is high.

Therefore, in Case 2, it is desired that the length L of the pole antenna 65 should be regulated to 100 cm, so that the receiving sensitivity to radio broadcast waves can be ensured.

Case 3: The case wherein the vehicle is in the occupied state and the radio receiver power switch 62a is in the off state When the vehicle is in the occupied state, the need for the pole antenna 65 to be used for keyless entry system is low: and so the pole antenna 65 can be stowed away into the body.

When the radio receiver power switch 62a is in the off state, the pole antenna 65 is not required as that for radio broadcasting; and so the pole antenna 65 can be stowed away into the body.

Therefore, in Case 3, it is desired that the pole antenna 65 should be stowed away into the body.

Here, the antenna length L is regulated according to the cases 1–3, but this is just one example. The case division is desirably set as necessary.

Figure 16:
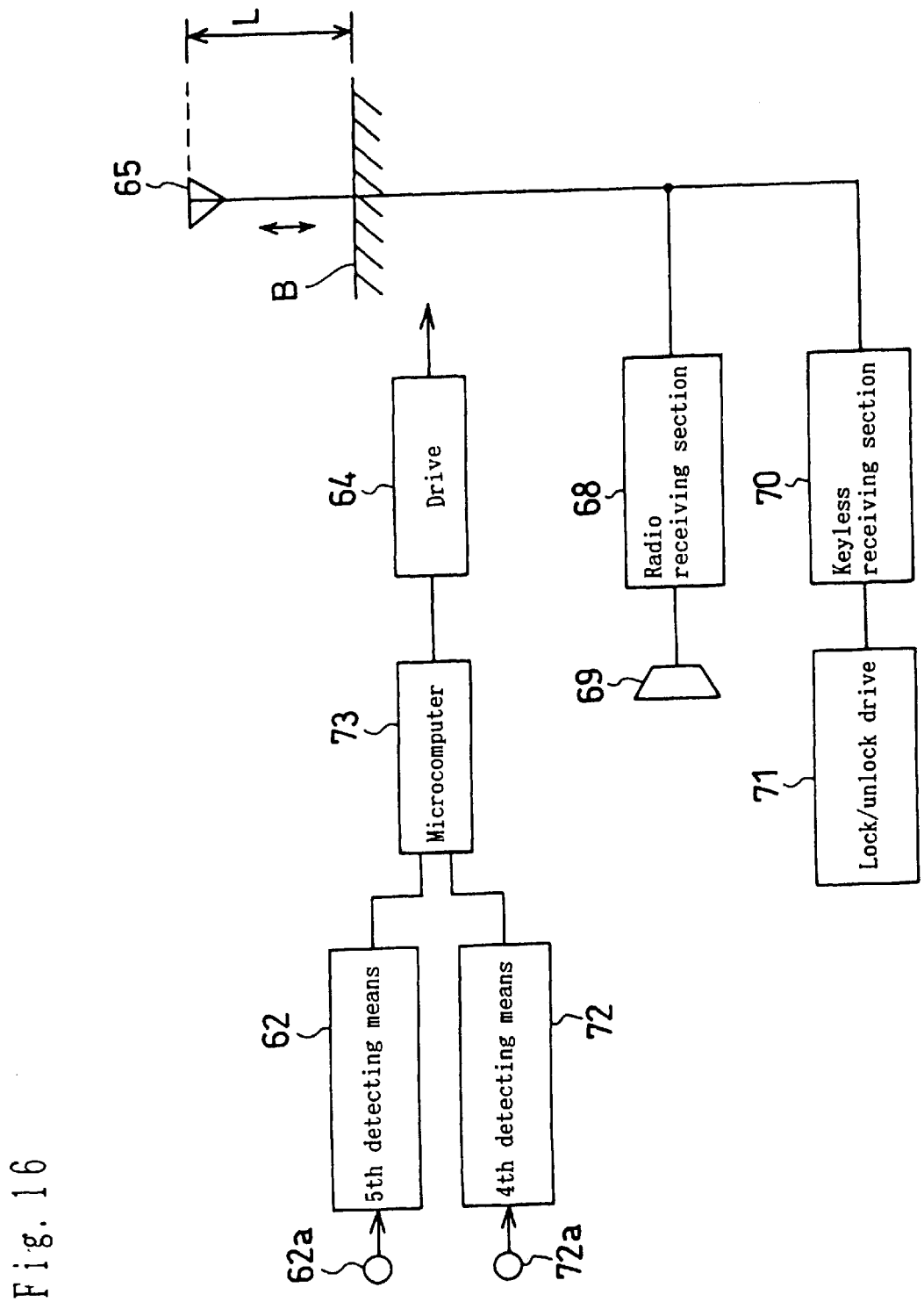
FIG. 16 is a block diagram schematically showing the principal part of an antenna device according to the third embodiment.

FIG. 16 is a block diagram schematically showing the principal part of an antenna device according to a third embodiment. Here, the description of the same construction as that of the antenna device shown in FIG. 13 is omitted A fifth detecting means 62 to detect the on/off state of a radio receiver power switch 62a and a fourth detecting means 72 to detect the on/off state of an ignition switch 72a are connected to a microcomputer (corresponding to a ninth control means) 73, which is connected to a drive 64.

Figure 17:
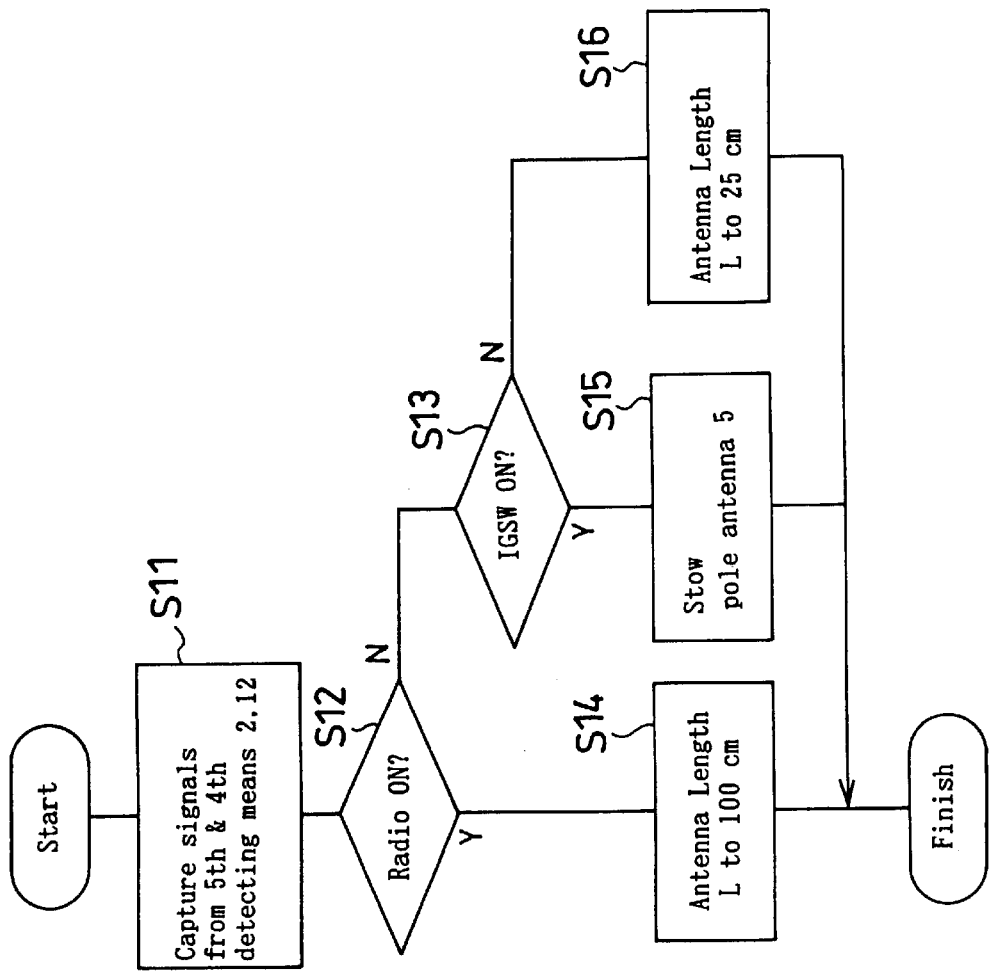
FIG. 17 is a flowchart showing the operation of a microcomputer in the antenna device according to the third embodiment.

The operation of the microcomputer 73 in the antenna device (3) according to the embodiment is described by reference to a flowchart shown in FIG. 17.

At step 11, the microcomputer 73 captures signals indicating the on/off state of the radio receiver power switch 62a and the on/off state of the ignition switch 72a from the fifth detecting means 62 and the fourth detecting means 72, going to step 12.

At step 12, it judges whether the radio receiver power switch 62a is in the on state or not. When it makes a judgement that the switch is in the on state, it moves to step 14. It outputs a pulse signal having a pulse length corresponding to 100 cm to control the drive 64 so that the antenna length L becomes 100 cm, the maximum extended length. On the other hand, when it makes a judgement that the switch is in the off state, it moves to step 13.

At step 13, it judges whether the ignition switch 72a is in the on state or not. When it makes a judgement that the switch is in the on state, it moves to step 15. It outputs a pulse signal to control the drive 64 so that the pole antenna 65 is stowed away into the body. On the other hand, when it makes a judgement that the switch is in the off state, it moves to step 16. It outputs a pulse signal having a pulse length corresponding to 25 cm to control the drive 64 so that the antenna length L becomes 25 cm.

Using the antenna device according to the third embodiment, since the antenna length L of the pole antenna 65 projected outward from the vehicle body is regulated in accordance with the on/off state of the radio receiver power switch 62a and the on/off state of the ignition switch 72a so as to keep the antenna length L within the minimum required range. The antenna can be protected from damage caused by a touch with an obstacle, mischief or the like, so that the possibility that the antenna is damaged can be reduced.

The control at the step 14, 15, or 16 is adapted to the below-described cases, respectively.

Case 1: The case wherein the radio receiver power switch 62a is in the on state

The possibility that someone is in the vehicle is high;

the risk of suffering damage is low;

the need to protect the pole antenna 65 from damage is low; and so it is possible to regulate the antenna length L to the maximum extended length (100 cm).

Therefore, in Case 1, it is desired that the length L of the pole antenna 65 should be regulated to 100 cm, so that the receiving sensitivity to radio broadcast waves can be ensured.

Case 2: The case wherein the radio receiver power switch 62a is in the off state and the ignition switch 72a is in the on state When the ignition switch 72a is in the on state, the possibility that a driver is existent in the vehicle is high;

the need for the pole antenna 65 to be used for keyless entry system is low; and so the pole antenna 65 can be stowed away into the body.

When the radio receiver power switch 62a is in the off state, the pole antenna 65 is not required as that for radio broadcasting; and so the pole antenna 65 can be stowed away into the body.

Therefore, in Case 2, it is desired that the pole antenna 65 should be stowed away into the body.

Case 3: The case wherein the radio receiver power switch 62a is in the off state and the ignition switch 72a is in the off state The possibility that a driver is not existent in the vehicle is high, and so the need for the pole antenna 65 to be used for keyless entry system is high.

Therefore, in Case 3, it is desired that the length L of the pole antenna 65 should be a length suitable for receiving keyless signals (25 cm), not 100 cm.

Here, the antenna length L is regulated according to the cases 1–3, but this is just one example. The case division is desirably set as necessary.

In the antenna device according to the third embodiment, whether the driver is existent in the vehicle or not is judged by detecting the on/off state of the ignition switch 72a. But it can be judged similarly by detecting the occupied/empty state of the driver's seat using an infrared sensor or a load sensor applied to the driver's seat, or the running/stop state of the engine.

In the antenna device according to the second or third embodiments, the antenna length L is regulated in accordance with two kinds of states, the on/off state of the radio receiver and, the occupied/empty state of the vehicle, or the on/off state of the ignition switch, or the running/stop state of the engine, or the presence/absence of the driver in the vehicle. But it is possible as a matter of course to regulate the length L of the pole antenna 65 in accordance with three or more kinds of states. For example, the length L of the pole antenna 65 may be regulated to an appropriate length in accordance with the on/off state of the radio receiver, the occupied/empty state of the vehicle, and the occupied/empty state of the driver's seat.

In the antenna device according to the second embodiment, when the vehicle is in the occupied state and the radio receiver power switch is in the off state, the pole antenna 65 is stowed away into the body. But in some cases, inconvenience is caused.

Case A: The case wherein a driver is existent in the vehicle

The need for the pole antenna 65 to be used for keyless entry system is low: and so it is possible to stow the pole antenna 65 away into the body.

Case B: The case wherein a child or children are existent in the vehicle

The driver is not existent in the vehicle, and so the need for the pole antenna 65 to be used for keyless entry system is high.

In both Case A and Case B, the vehicle is in the occupied state.

Even when the vehicle is in the occupied state, the pole antenna 65 is sometimes required to be used for keyless entry system like in Case B. But in the antenna device according to the second embodiment, the pole antenna 65 is stowed away into the body. Therefore, by arranging an infrared sensor, or the like which senses the occupied/empty state of the driver's seat in the antenna device according to the second embodiment, so as to take the presence/absence of the driver in the vehicle into consideration, Case A and Case B can be distinguished, so that the above inconvenience can be solved.

In one of the antenna devices according to the first through third embodiments, in order to obtain the optimum antenna length L to the wavelength of each received radio broadcast wave, the function to regulate the length L automatically in accordance with the frequency may be included in its construction.

An antenna device according to a fourth embodiment, is described below. In the antenna device according to the fourth embodiment, glass antennas are adopted as antennas for keyless entry system. The glass antennas are arranged on all of the front, rear, left and right window glasses. FIGS. 18(a), and 18(b) show a vehicle 66 on which glass antennas 67a–67d are arranged.

Using the antenna device according to the fourth embodiment, since the glass antennas 67a–67d are arranged on every direction of the front, rear, left and right of the vehicle 66, equal receiving sensitivity can be obtained to a keyless signal sent from any direction.

In the antenna device (4), according to the embodiment, by using part of or all of the glass antennas 67a–67d both for keyless entry systems and for radio broadcasting, the placement construction thereof can be simplified and the cost can be reduced.

In any of the antenna devices according to the embodiments, the drive which performs the lock/unlocking of vehicle doors, trunk, and the like is exemplified as a drive in the description. But the drive is not limited to that. A drive which performs the opening/closing of mirrors or the starting/stopping of the engine may be available.

What is claimed is:

1. A mobile receiver, comprising an antenna used both for receiving remote control signals for remotely controlling a drive mounted on a vehicle and for receiving radio signals, remote control receiving circuits and radio receiving circuits, an intermediate frequency amplifier circuit of the remote control receiving circuits and an intermediate frequency amplifier circuit of the radio receiving circuits being one and the same, the remote control receiving circuits, including:

a remote control frequency converter for converting remote control signals input through the antenna to intermediate frequency signals of a prescribed frequency and outputting the signals to the intermediate frequency amplifier circuit;

a remote control detector circuit for detecting the intermediate frequency signals amplified in the intermediate frequency amplifier circuit and outputting remote control detected signals; and a remote control filter for taking only remote control signals out of the remote control detected signals output from the remote control detector circuit; and the radio receiving circuits, including:

a radio frequency converter for converting radio signals input through the antenna to intermediate frequency signals of the prescribed frequency and outputting the signals to the intermediate frequency amplifier circuit;

a radio detector circuit for detecting the intermediate frequency signals amplified in the intermediate frequency amplifier circuit and outputting radio detected signals; and a radio filter for taking only radio signals out of the radio detected signals output from the radio detector circuit;

the frequency converters each and the filters each being separate; and the antenna being normally connected to both the remote control frequency converter and the radio frequency converter.

2. A mobile receiver according to claim 1, wherein the first and second frequency conversion means comprise local oscillator circuits.

3. A mobile receiver according to claim 1, wherein the first and second frequency conversion means comprise local oscillator circuits and mixing circuits.

4. A mobile receiver according to claim 1, including:

the remote control receiving circuits including plural signal processing elements to output a processed signal to the next step;

switches being interposed in each power line for supplying electric power to each of the signal processing elements; and a first control means to perform sequential intermittent on/off control of each of the switches at a prescribed timing.

5. A mobile receiver according to one of claims 4, wherein each of the signal processing elements is a first frequency conversion means to convert a signal input from the antenna into a prescribed frequency, an amplifier circuit to amplify the received signal converted by the first frequency conversion means, or a first filter for filtering the received signal amplified in the amplifier circuit to separate a signal for radio receiver from a signal for remote control.

6. A mobile receiver according to claim 1, including:

the remote control receiving circuits including plural signal processing elements to output a processed signal to the next step;

switches being interposed in each power line for supplying electric power to each of the signal processing elements;

a second control means to perform on/off control of each of the switches; and delay circuits being interposed in each control line for transmitting an on/off control signal from the second control means to each of the switches, whereby each of the switches is intermittently turned on and off in sequence.

7. A mobile receiver according to claim 6, wherein each of the signal processing elements is a first frequency conversion means to convert a signal input from the antenna into a prescribed frequency, an amplifier circuit to amplify the received signal converted by the first frequency conversion means, or a first filter for filtering the received signal amplified in the amplifier circuit to separate a signal for radio receiver from a signal for remote control.

8. A mobile receiver according to claim 1, including:

the remote control receiving circuits including plural signal processing elements to output a processed signal to the next step;

switches being interposed in each power line for supplying electric power to each of the signal processing elements;

a judging means to detect a signal output from a given signal processing element being supplied with electric power and judging whether a remote control signal is existent in the output signal or not; and a third control means to perform on/off control of the switch interposed in the power line for supplying electric power to a signal processing element in the next step to the given signal processing element on the basis of the judgement result from the judging means, whereby each of the switches is intermittently turned on and off in sequence.

9. A mobile receiver according to claim 8, wherein each of the signal processing elements is a first frequency conversion means to convert a signal input from the antenna into a prescribed frequency, an amplifier circuit to amplify the received signal converted by the first frequency conversion means, or a first filter for filtering the received signal amplified in the amplifier circuit to separate a signal for radio receiver from a signal for remote control.

10. A mobile receiver according to claim 1, wherein the drive performs the lock/unlock of the vehicle doors and the like.

* * * * *